US010996141B2

(12) United States Patent
Anderson

(10) Patent No.: US 10,996,141 B2
(45) Date of Patent: May 4, 2021

(54) METHOD AND AN AUTONOMOUS GROUND VEHICLE

(71) Applicant: Intel Corporation, Santa Clara, CA (US)

(72) Inventor: Glen Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 250 days.

(21) Appl. No.: 16/145,227

(22) Filed: Sep. 28, 2018

(65) Prior Publication Data

US 2019/0049342 A1 Feb. 14, 2019

(51) Int. Cl.

| | |
|---|---|
| ***G01M 17/007*** | (2006.01) |
| ***B60W 40/02*** | (2006.01) |
| ***B60W 40/08*** | (2012.01) |

(52) U.S. Cl.

CPC .......... *G01M 17/007* (2013.01); *B60W 40/02* (2013.01); *B60W 40/08* (2013.01); *B60W 2040/0881* (2013.01); *B60W 2400/00* (2013.01); *B60W 2554/00* (2020.02); *B60W 2554/80* (2020.02)

(58) Field of Classification Search

CPC .... G01M 17/007; B60W 40/02; B60W 40/08; B60W 2554/00; B60W 2554/80; B60W 2400/00; B60W 2040/0881; B60W 60/001; B60W 2050/046; B60W 50/045; G01C 21/3415; G01C 1/00

See application file for complete search history.

(56) References Cited

U.S. PATENT DOCUMENTS

| | | | | |
|---|---|---|---|---|
| 9,290,174 | B1 * | 3/2016 | Zagorski | B60K 28/06 |
| 9,836,895 | B1 * | 12/2017 | Nygaard | G05D 1/0088 |
| 2010/0274435 | A1 * | 10/2010 | Kondoh | B60W 40/09 701/31.4 |
| 2016/0040630 | A1 * | 2/2016 | Li | F02M 25/0809 73/40.5 R |
| 2017/0132118 | A1 * | 5/2017 | Stefan | G06F 11/3668 |
| 2017/0180370 | A1 * | 6/2017 | Satoh | G06F 21/566 |
| 2018/0105175 | A1 * | 4/2018 | Muller | B60R 16/037 |
| 2018/0202408 | A1 * | 7/2018 | Majima | B60W 30/192 |
| 2018/0288848 | A1 * | 10/2018 | Gao | H04N 7/183 |
| 2019/0051159 | A1 * | 2/2019 | Wang | G05D 1/0027 |
| 2019/0220011 | A1 * | 7/2019 | Della Penna | G08G 1/0133 |
| 2019/0383239 | A1 * | 12/2019 | Dudar | F02M 25/0836 |
| 2020/0072966 | A1 * | 3/2020 | Fang | G01S 13/867 |

OTHER PUBLICATIONS

Dosovitskiy, Alexey et al.; "Carla: An Open Urban Driving Simulator"; 1st Conference on Robot Learning (CoRL 2017), Mountain View, United States; 16 pages.

* cited by examiner

*Primary Examiner* — Genna M Mott

(74) *Attorney, Agent, or Firm* — Viering, Jentschura & Partner MBB

(57) ABSTRACT

A method for operating an autonomous ground vehicle may include: via one or more processors, determining an occupation state of the autonomous ground vehicle; if the occupation state is unoccupied, autonomously initiating a testing routine, the testing routine comprising: determining a test location, determining a safety parameter of the test location; if the safety parameter fulfils a safety criterion, testing an autonomous driving system of the autonomous ground vehicle in the test location.

20 Claims, 19 Drawing Sheets

100

101 determining an occupation state of the autonomous ground vehicle

103

105 determining a test location 107 determining a safety parameter of the test location 109 testing an autonomous driving system of the autonomous ground vehicle in the test location 111 restarting the testing routine, postponing the testing routine or aborting the testing routine 100
101
determining an occupation state of the autonomous ground vehicle
103
determining a test location
105
107
determining a safety parameter of the test location
testing an autonomous driving system of the autonomous ground vehicle in the test location
109
111
restarting the testing routine, postponing the testing routine or aborting the testing routine 400
202
302
204
204l
206
208
204w 700
216s
216
204
216
204s
206
206s 801
803
805
800a
204
302
502
206
807
809
811

900
216
202
302
204
206
206s
204l
502
204s
208
204w 1100
1103
1101
206
1102
216
1105
1106
1104

1300
1301
initiate testing the autonomous driving system
100
occupation determination
101
103
initiating a testing routine 1400
1402
204
204l
206
208
204w

METHOD AND AN AUTONOMOUS GROUND VEHICLE

TECHNICAL FIELD

Various aspects of this disclosure relate generally to a method and an autonomous ground vehicle.

BACKGROUND

In general, testing self-driving vehicles while they are on the road is a difficult approach as they potentially interfere with other traffic and thus risk to harm people. As alternative, controlled road tests in a controlled environment or simulations are carried out.

For simulations, a simulation software is applied to autonomous vehicles such as CARLA, which is an open-source autonomous driving simulator. Such simulation software has configurable settings for weather conditions, traffic rules, pedestrians, and other obstacles and provides a visual of the simulation as well as the resulting data. Such simulations have been used to test how self-driving cars would behave in certain situations.

Synthetic tests are conventionally carried out for self-driving vehicles in settings like company campuses and on public roads with passengers behind the steering wheel.

SUMMARY

According to various aspects of this disclosure, a method for operating an AGV 206 may include: via one or more processors, determining an occupation state of the autonomous ground vehicle; if the occupation state is unoccupied, autonomously initiating a testing routine, the testing routine comprising: determining a test location, determining a safety parameter of the test location; if the safety parameter fulfils a safety criterion, testing an autonomous driving system of the autonomous ground vehicle in the test location.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of this disclosure are described with reference to the following drawings, in which.

DESCRIPTION

Figure 1:
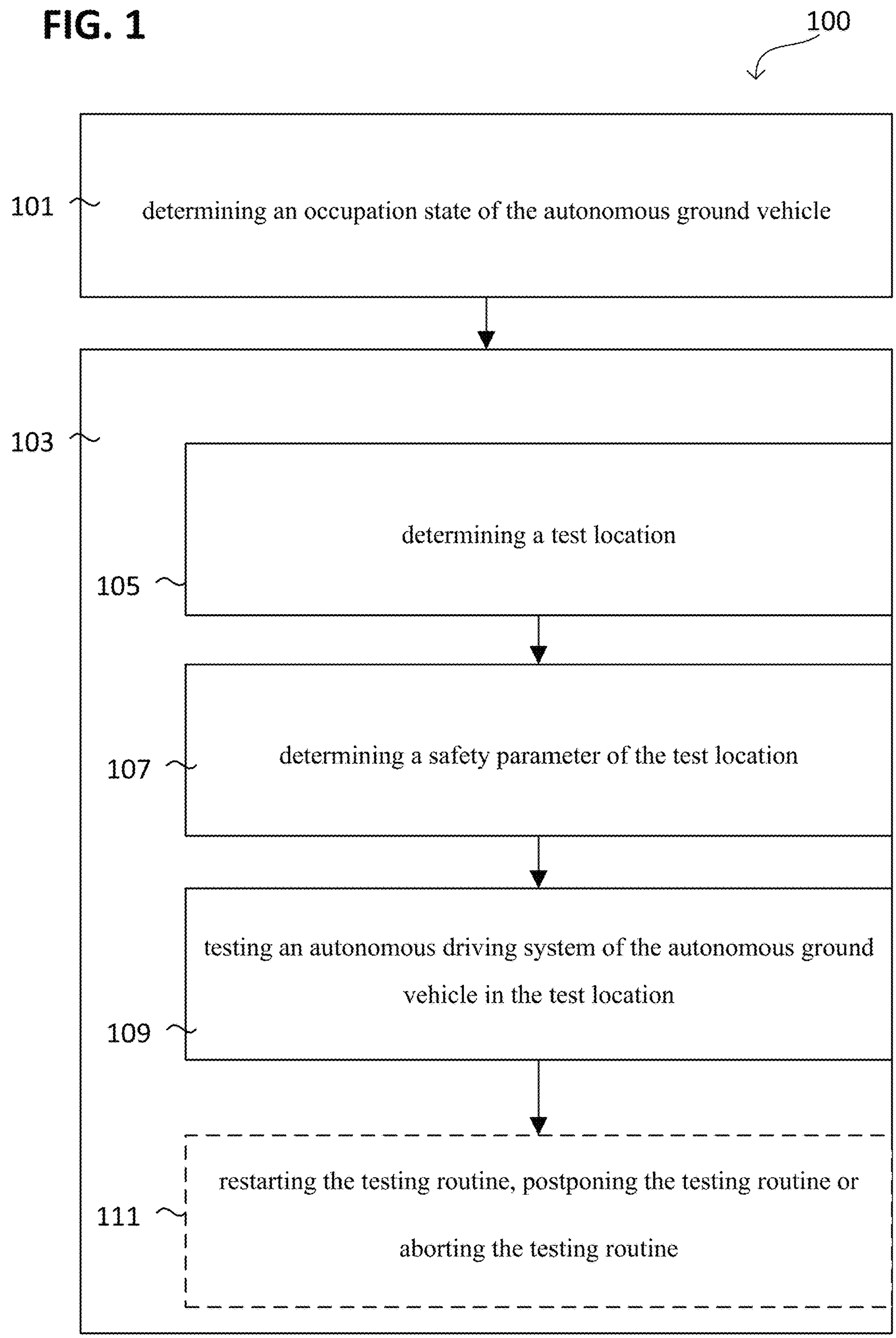
FIGS. 1 to 17 respectively show a method according to various aspects of this disclosure.

The following detailed description refers to the accompanying drawings that show, by way of illustration, specific details and aspects in which the invention may be practiced.

The word “exemplary” is used herein to mean “serving as an example, instance, or illustration”. Any aspect or design described herein as “exemplary” is not necessarily to be construed as preferred or advantageous over other aspects or designs.

The phrase “at least one of” with regard to a group of elements may be used herein to mean at least one element from the group consisting of the elements. For example, the phrase “at least one of” with regard to a group of elements may be used herein to mean a selection of: one of the listed elements, a plurality of one of the listed elements, a plurality of individual listed elements, or a plurality of a multiple of listed elements.

The term “processor” or “controller” as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term “system” (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

The term “circuit” may be understood as any kind of a logic implementing entity, which may be special purpose circuitry or a processor executing software stored in a memory, firmware, or any combination thereof. Thus, a “circuit” may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A “circuit” may also be a processor executing software, e.g. any kind of computer program, e.g. a computer program using a virtual machine code such as e.g. Java.

Any other kind of implementation of the respective functions which will be described in more detail below may also be understood as a “circuit”. It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a “circuit” may refer to two or more circuits that collectively form a single circuit.

As used herein, “memory” may be understood as a non-transitory computer-readable medium in which data or information can be stored for retrieval. References to “memory” included herein may thus be understood as referring to volatile or non-volatile memory, including random access memory (“RAM”), read-only memory (“ROM”), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as “memory” or “a memory” may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "position" or used herein with regard to a "position of an object", "position of an obstacle", and the like, may be used herein to mean a point in a two- or three-dimensional space. The term "location" and the like, may be used herein to mean a spatial region in a two- or three-dimensional space. It is understood that suitable coordinate systems (e.g., a geolocational coordinate system) with respective reference points are used to describe positions, vectors, movements, and the like.

An autonomous ground vehicle (AGV) is a ground vehicle that has the capability of ground-based autonomous motion. In autonomous motion, a human pilot (also referred as to driver) is not aboard and/or in control of the AGV. The autonomous motion may be provided in an autonomous operation mode of the AGV. However, in the autonomous operation mode of the autonomous ground vehicle, one or more passengers may be aboard the autonomous ground vehicle, but not in control of the autonomous ground vehicle. If a passenger takes over control of the autonomous ground vehicle (than also referred as to the human pilot), the autonomous ground vehicle may enter the manual operation mode, e.g., manual driving mode. For example, the autonomous ground vehicle may be switched into the manual operation mode in response to a passenger acting on the steering wheel, or commanding otherwise. The AGV may be a self-driving vehicle, e.g., car. The AGV being free of any passenger (including the human pilot), may be unoccupied. The unoccupied AGV may also be denoted as unstaffed or uninhabited ground vehicle.

As used herein, the term "if" with regard to a condition to occur or be fulfilled, and a certain action to be carried out, may include that the action is carried out in response to determining that the condition occurs or is fulfilled. For example, the term "if a safety parameter fulfils a safety criterion, testing the first means in the test location" may include "testing the first means in the test location in response to a safety parameter is determined to fulfil a safety criterion".

Various steps of the following method may be carried out when the autonomous ground vehicle is in the manual operation mode or in the autonomous operation mode, e.g., one or more sensing, processing or determining steps. However, various steps of the following method may be carried out autonomously by the autonomous ground vehicle, e.g., in response to a certain condition or result from a previous action. The autonomously carried out steps or actions may be carried out by the autonomous ground vehicle on its own motion, e.g., without being controlled by a person.

Safely testing self-driving vehicles while they are on the road is difficult as they may be occupied by people and tests have potential to interfere with other traffic. A method is provided for performing tests on self-driving cars without harming passengers in the vehicle or surrounding traffic.

It was realized that some tests are difficult or inconvenient to replicate in a controlled environment. Furthermore, it was realized that vehicles that are continuously tested make sure that software and hardware that enables self-driving functionality is working properly.

The variety of conditions and physical attributes present in reality are difficult to simulate, particularly for a particular car which may have individually faulty sensors. Performing live tests is beneficial because if the car does not respond as expected, it may be possible to identify hardware issues with sensors or other problems associated with that particular car.

Testing self-driving vehicles in lab-like environments is useful to collect data but does not account for the variety of road, traffic, and weather conditions that vehicles would encounter elsewhere. It would also be inconvenient to regularly bring or send a car somewhere to be tested, so a solution that did not force this would be optimal. Some tests would be dangerous or startling for passengers in the case of an occupied vehicle, such as observing reaction time when another vehicle brakes hard in front of the one being tested, so it would be better if there were no passengers when the tests took place.

One or more self-driving vehicles may perform checks to ensure that live tests can be safely run to test redundancy of self-driving capabilities and functionality that is not easily replicated in a controlled environment or simulation. The one or more vehicles may ensure that the road is clear of other traffic and that they are not transporting a passenger, at which point they may perform tests that would normally disrupt passengers or cause them unnecessary risk if they were in the vehicle such as hard stops and crash avoidance maneuvers.

Multiple possibilities are provided according to the following: (a) a system of safely performing tests on self-driving cars while they are on the road; (b) a method of verifying that such tests can be performed without harm to passengers or other traffic.

As self-driving vehicles are introduced, they may can be continuously and individually tested to ensure that they continue to meet standards. Since self-driving vehicles will not always be occupied or in-use, they can be tested in a live environment. As some of these tests may be inconvenient or dangerous for passengers, having solutions that make this possible are compelling.

Self-driving vehicles that are periodically tested may ensure that they respond and function as expected, and some of these tests may gain benefit if the car is operating in a realistic environment. In order to do this, self-driving cars may ensure that it is safe to perform such tests and then execute them appropriately. Certain tests might require particular conditions, so self-driving vehicles may detect those conditions and respond accordingly. An example of such tests would be testing the response of a vehicle when cut off or approached closely by another (tests that would alarm passengers and potentially risk their safety).

A self-driving vehicle may ensure that it would be safe to perform a test by verifying that it has no passengers and that it would not impact surrounding traffic. The vehicle may verify that it has no passengers with a variety of internal sensors such as cameras, infrared sensors and weight detection or with external sensors from other vehicles or roadside sensors. The vehicle may also require the vehicle owner's validation that it can be tested as an additional safeguard. Internal and external sensors may report traffic conditions to the vehicle to determine if it is safe to run tests, or to determine where it is safe to run tests.

Once it is determined that it is safe to perform a test, a location may be determined to perform the test and virtual or physical objects such as vehicles may be included to assist in the test. For example, another vehicle may be used to test sensors on another by slowing down in front of it or approaching it quickly, or by sending it a notification of its intentions to see how the vehicle responds. Sensors on the vehicle aiding in the test, roadside sensors, and sensors on the vehicle being tested may be used to monitor the results which may then be reported back to the vehicle or an external system for analysis.

One or more test may be initiated in a variety of ways, including automatically by the one or more vehicles when convenient, by car owners, or insurance companies.

One or more test may be initiated based on a vehicle's recent actions/performance observed by itself, other vehicles or roadside sensors.

Multiple vehicles may be used to test one another's accident avoidance and traffic handling algorithms.

The vehicle to be tested may use other vehicles and/or objects to aid in the testing, for example having another vehicle brake in front of it. These vehicles and/or objects may be real or virtual.

The one or more vehicles not being tested may avoid actual collisions by communicating with the vehicle being tested.

A variety of methods may be used to ensure vehicles have no passengers, including sensors within the vehicle and sensors outside the vehicle A variety of methods may be used to isolate one or more vehicles to be tested, such as breaking from a traffic group, using a less busy road, or performing tests during low traffic times.

Determining whether tests are needed for a given vehicle may be decided by surrounding vehicles if they notice abnormalities in driving patterns.

The location for a test to take place may be determined based on current traffic patterns and may even be enforced by other vehicles. For example, one or more other vehicles may slow down traffic slightly to create a larger space.

Certain tests may require particular conditions, so one or more vehicles may take advantage of such conditions as they occur.

Machine learning may enhance the effectiveness of tests to be carried out or that have been carried out.

FIG. 1 illustrates a method 100 in a schematic flow diagram. The method 100 may be configured for operating an AGV 206.

The method 100 may include in 101, determining an occupation state of the autonomous ground vehicle (also referred as to occupation determination 101), e.g., via one or more processors. Illustratively, the occupation state represents whether and/or how many human passengers are within the autonomous ground vehicle. For example, the occupation state may be determined to be one of unoccupied or occupied.

For example, the autonomous ground vehicle 206 (AGV 206) may include the one or more processors. Additionally or alternatively, the one or more processors may read corresponding instructions that are stored on a memory.

The method 100 may include in 103, initiating a testing routine, e.g., in response to determining that the occupation state is unoccupied. The testing routine may be initiated autonomously and/or by the one or more processors. The autonomously initiating may include that the autonomous ground vehicle will initiate the testing routine on its own motion and/or in response to the determining of the occupation state to be unoccupied.

The occupation state may be determined by sensing the autonomous ground vehicle, e.g., the interior of the autonomous ground vehicle. The sensing may be carried out by one or more sensors and/or instructed by the one or more processors.

The occupation state may be determined as unoccupied in response to sensing that a passenger is absent in the autonomous ground vehicle, e.g., if the interior of the autonomous ground vehicle is free of a passenger. In other words, the occupation state may be determined as unoccupied, if the autonomous ground vehicle is unmanned. Illustratively, if the autonomous ground vehicle is tested in an unmanned condition, the risk of personal damage will be minimized.

The testing routine may include in 105 determining a test location. The testing routine may include in 107 determining a safety parameter of the test location. The testing routine may include in 109 testing an autonomous driving system of the autonomous ground vehicle (also referred as to driving system test or DST) in the test location, e.g., in response to determining the safety parameter fulfils a safety criterion. Illustratively, the safety parameter represents the risk of personal damage due to the testing. Illustratively, the safety criterion represents the acceptable risk of personal damage due to the testing.

The DST may be autonomously initiated, e.g., by the autonomous ground vehicle on its own motion and/or in response to determining that the safety parameter fulfils a safety criterion.

The DST may be a test of various types, e.g., including at least one of the following test types: a collision avoidance type, a lane keep type, an autonomous parking type, an intelligent speed adaption type, an anti-lock braking type, an overtaking maneuver type, a collision mitigation brake type, a cornering brake type, and the like.

The test location may be a geolocational area, e.g., having an area of about or less than 4 $km^2$ (square kilometers), e.g., of about or less than 3 $km^2$, e.g., of about or less than 2 $km^2$, e.g., of about or less than 2 $km^2$, e.g., of about or less than 1 $km^2$. Additionally or alternatively, the test location may include at least one road or drivable ground, e.g., ground being asphalted.

The determination of the safety parameter may optionally include sensing safety parameter by one or more sensors.

The safety parameter may represent the level of occupation of the test location with automobile traffic (e.g., other automobiles), with personal traffic (e.g., people), and/or with stationary automobiles (e.g., parking cars). Illustratively, the safety parameter may be lower, the more automobiles or people are sensed to be in the test location. Illustratively, the safety parameter may be higher, the less automobiles or people are sensed to be in the test location. A high safety parameter may for example, fulfill the safety criterion. Illustratively, if the test location is free of automobiles and/or people, the risk of personal damage will be minimized.

For example, the safety criterion may be fulfilled, if less than about 10 (e.g., 5, e.g., 2, e.g., no) automobiles and/or people are in the test location.

Additionally or alternatively, the safety parameter may represent the size of the area in which the test location is free of automobiles and/or people (also referred as to unoccupied testing location). Illustratively, the safety parameter may be higher, the more area of the test location is sensed to be free of automobiles and/or people.

For example, the safety criterion may be fulfilled, if less than about 10 (e.g., 5, e.g., 2, e.g., no) automobiles and/or people per 1 km are in the test location. Additionally or alternatively, the safety criterion may be fulfilled, if more than about 25% (e.g., 50%, e.g., 75%, e.g., 80%, e.g., 90%, e.g., 95%), e.g., all, of the area of the test location is free of automobiles and/or people. The testing location that is free of automobiles and/or people may be also referred as to unoccupied testing location. The testing location that fulfills the safety criterion may be also referred as to substantially unoccupied testing location.

Determining the test location may optionally include determining the expected spatial requirement of the intended type of test, e.g., based on the type of the DST and/or based on the course of one or more roads. For example, the test location may be based on an expected path or road to be used by the autonomous ground vehicle during the DST and may be optionally extended by a safety distance perimeter (e.g., 100 meters or more) around the path or road.

The testing routine may optionally include in 111, e.g., in response to the safety criterion is determined to be not fulfilled by the safety parameter, restarting the testing routine, postponing the testing routine or aborting the testing routine. The testing routine may be restarted or postponed, for example, before the DST is initiated. The testing routine may be aborted, for example, when the DST currently running. Illustratively, if automobiles and/or people are detected to enter the test location, aborting the DST will minimize the risk of personal damage. Aborting the testing routine may, for example, stop the DST.

Additionally or alternatively, the testing routine may be aborted, e.g., if an error is detected. Illustratively, if the autonomous ground vehicle (e.g., hardware or software) is defect, aborting the DST will minimize the risk of personal damage.

For example, the testing routine may be postponed, e.g., by a predefined period and/or to a point of time. Postponing the testing routine may include setting up a schedule event representing the period or point of time of the postponing. Postponing the testing routine may, for example, enable to wait until sufficient conditions for testing occur.

If the testing routine is restarted, another (e.g., second) test location may be determined, e.g., different to the previously determined test location (also referred as to first test location).

Optionally, restarting the testing routine may be carried out after completing the testing routine, e.g., in order to carry out a DST of another type.

Optionally, the determined safety parameter may be stored by the autonomous ground vehicle, e.g., forming a database that correlates multiple test locations with their respective safety parameter. Optionally, determining the test location may be based on the database.

Figure 2:
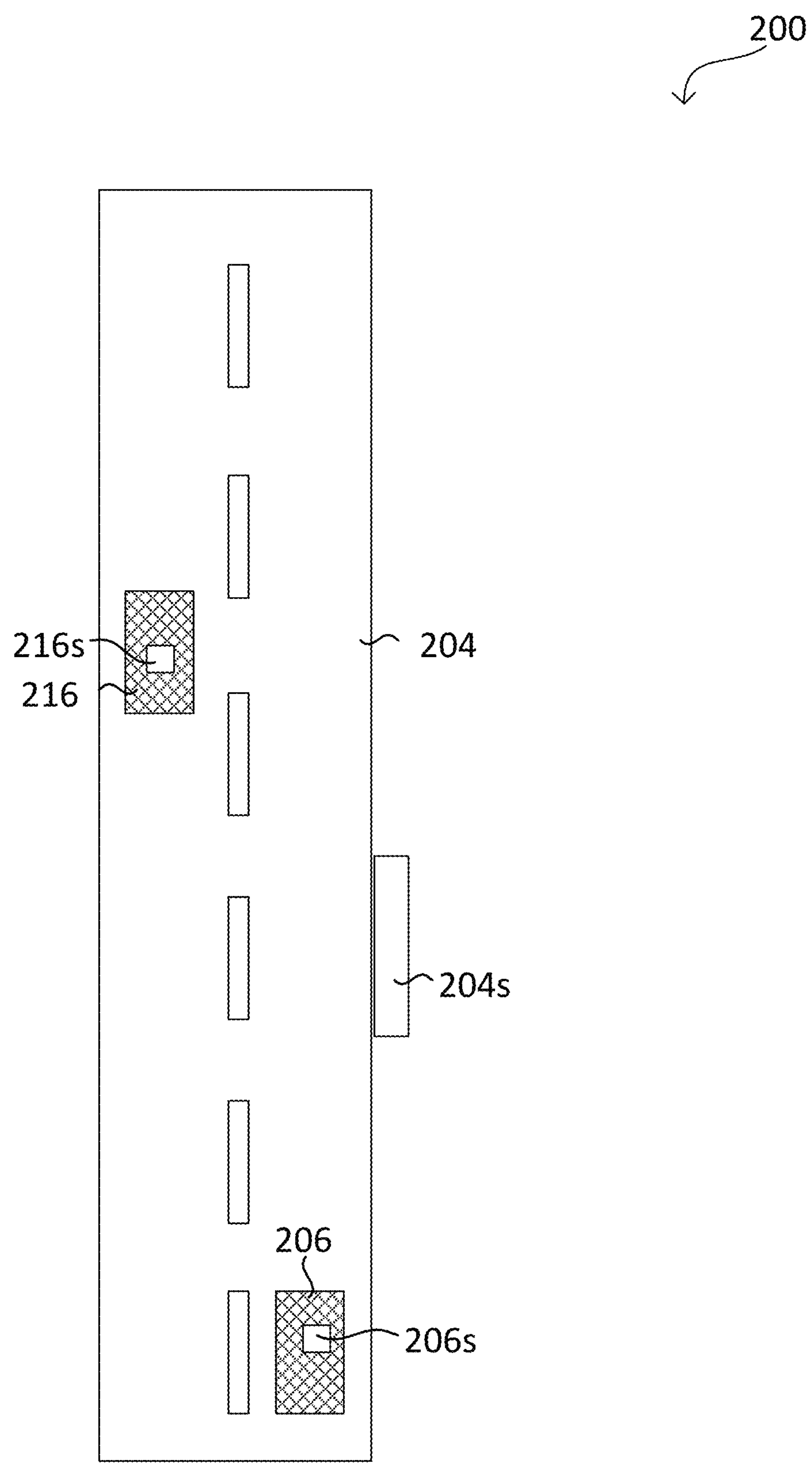

FIG. 2 illustrates a method 200 in a schematic top view, e.g., with a view direction towards ground. The method 200 may be configured for operating an AGV 206, e.g., including the method 100.

The method 200 may include detecting the occupation state of the AGV 206, e.g., by sensing the interior of the autonomous ground vehicle.

The sensing may, for example, by carried out by one or more sensors 206*s* of the AGV 206 (also referred as to one or more internal sensors). The one or more internal sensors 206*s* may include, for example, an infrared sensor, a radar sensor, a seat occupation sensor (e.g., a weight sensor), an ultrasonic sensor, a camera, a microphone, a motion sensor, an approaching sensor, and the like.

The sensing may, for example, by carried out by one or more sensors 206*s* external to the AGV 206 (also referred as to one or more external sensors). The one or more external sensors 216*s*, 204*s* may include at least one roadside sensor 204*s* and/or at least one sensor 216*s* of another vehicle 216 (also referred as to foreign vehicle 216). The one or more external sensors 216*s*, 204*s* may include, for example, an infrared sensor, a seat occupation sensor (e.g., a weight sensor), a camera, a microphone, motion sensor, and the like.

Figure 3:
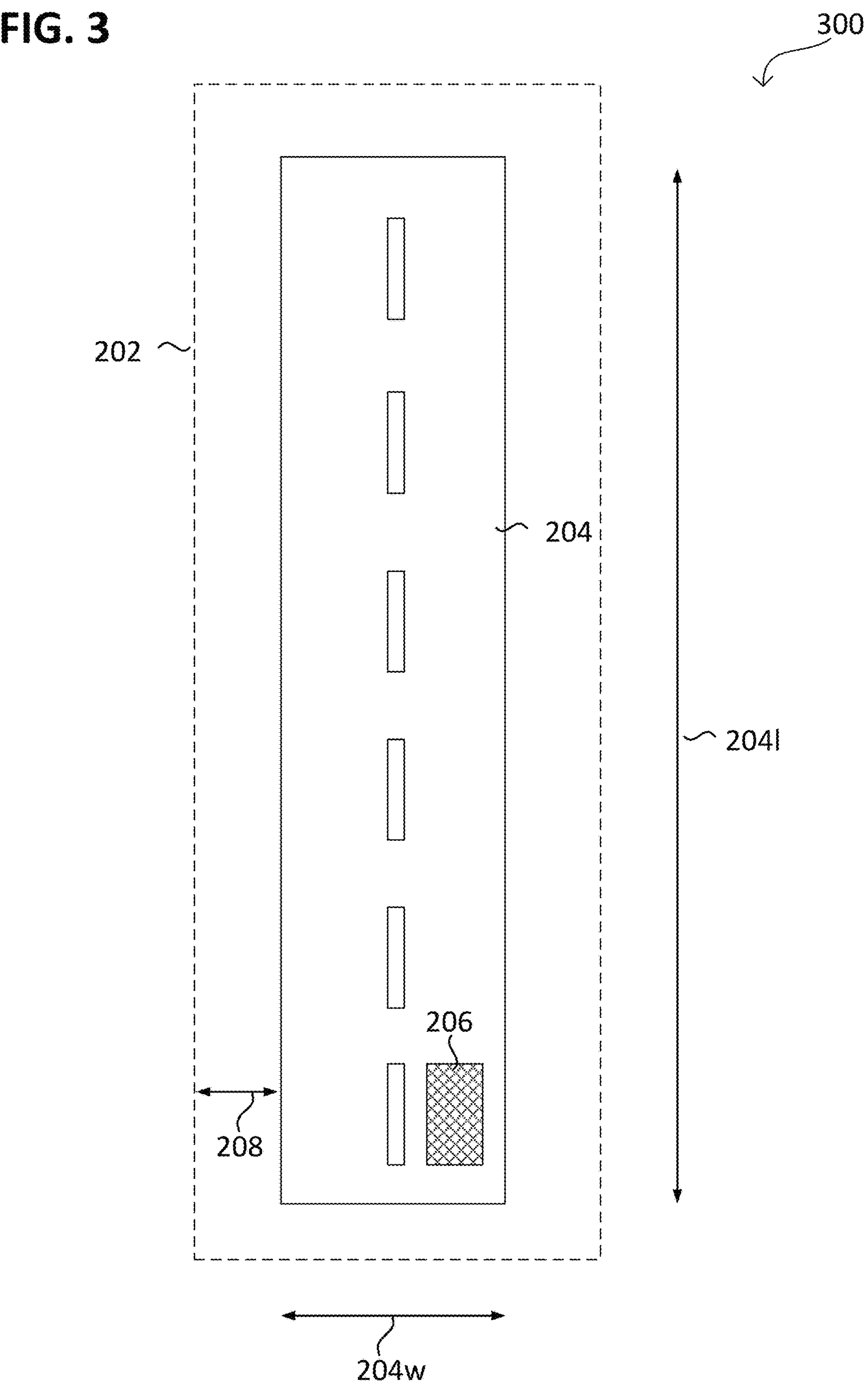

FIG. 3 illustrates a method 300 in a schematic top view, e.g., with a view direction towards ground. The method 300 may be configured for operating an AGV 206, e.g., including the method 100 or 200.

The test location 202 may be based on a section 204 of a road expected to be used by the AGV 206 during the DST. The section 204 of the road (more simple also referred as to road 204) may have a length 204*l* and a width 204*w*.

For example, the test location 202 may be geostationary. Alternatively, the test location 202 may be stationary regarding the AGV 206. The AGV 206 may, for example, be in motion, e.g., driving across a road, thus determining a test location having a vector of movement, e.g., based on the speed and driving direction of the AGV 206.

The test location 202 may have the size, e.g., length 204*l* and a width 204*w* of the road 204, or alternatively, may be extended by a safety distance 208 (e.g., 100 meters or more) around the road 204. The safety distance 208 may be about 100 (e.g., 250, 500) meters or more.

The larger the safety distance 208 is, the more the risk of personal damage will be minimized.

Optionally, the value of the safety distance 208 may be based on the type of DST. Illustratively, a breaking test will require less safety distance 208 than an overtaking maneuver.

Figure 4:
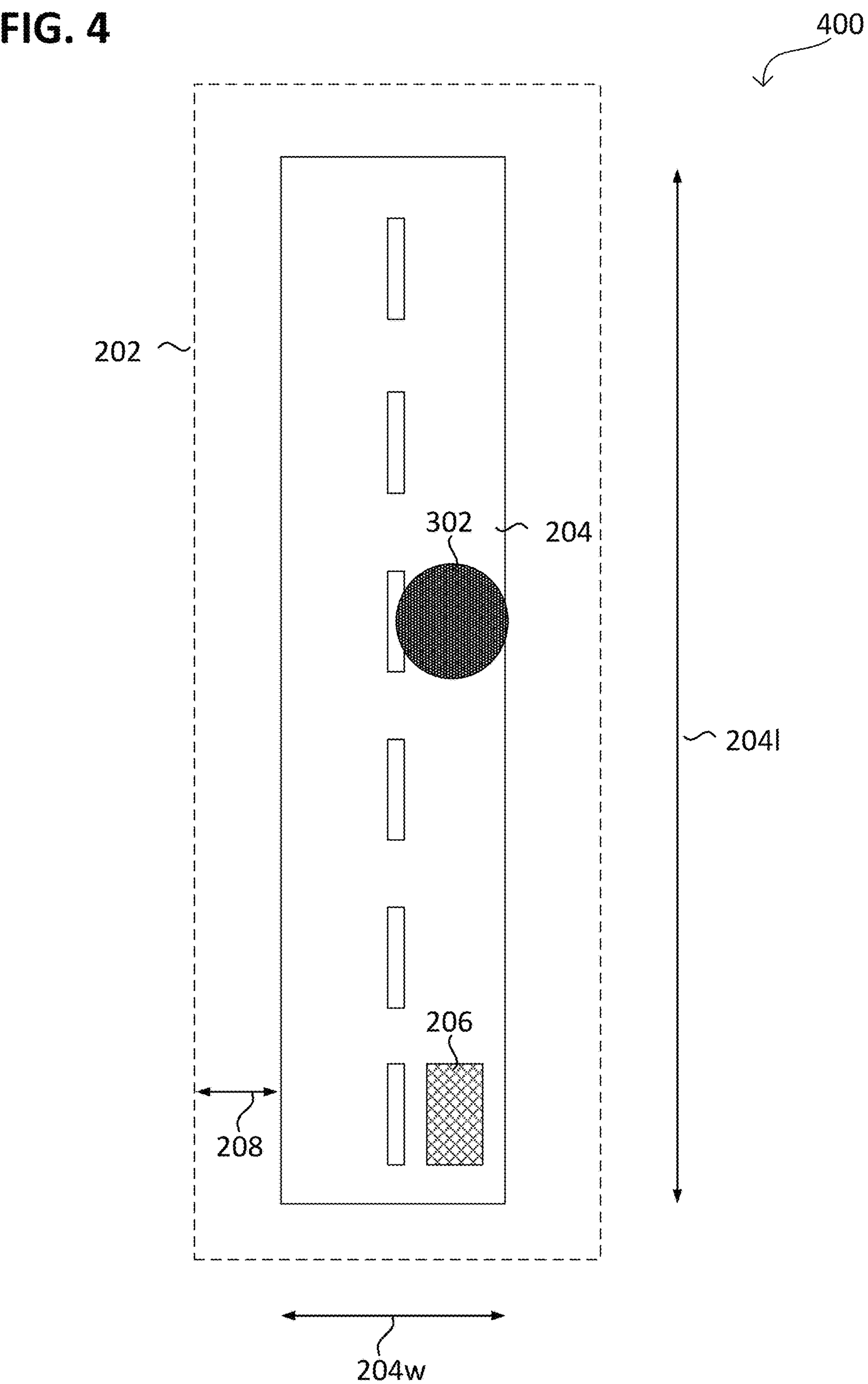

FIG. 4 illustrates a method 400 in a schematic top view, e.g., with a view direction towards ground. The method 400 may be configured for operating an AGV 206, e.g., including one of the methods 100 to 300.

The method 400 may include defining one or more obstacles 302 (also referred as to obstruction object). The one or more obstacles 302 may include at least one virtual obstacle 302. Additionally or alternatively, the one or more obstacles 302 may include at least one physical obstacle 302.

A virtual obstacle 302 may be understood as being simulated by software and input into the autonomous driving system of AGV 206. The autonomous driving system of AGV 206 may be also referred as to ADS. For example, the virtual obstacle 302 may represent one or more ground vehicles, one or more persons, and the like. Additionally or alternatively, the virtual obstacle 302 may have a vector of movement or may be set to be stationary regarding the testing location 202.

A physical obstacle 302 may be understood as being provided by a true (real) solid body. A physical obstacle 302 may be part of the environmental conditions in the testing location 202, e.g., a tree or wall. Additionally or alternatively, physical obstacle 302 may be provided by another autonomous ground vehicle, e.g., that has been requested to provide the physical obstacle 302.

Optionally, the obstacle 302 may have a vector of movement regarding the testing location 202. Alternatively, the obstacle 302 may be stationary regarding the testing location 202.

Figure 5:
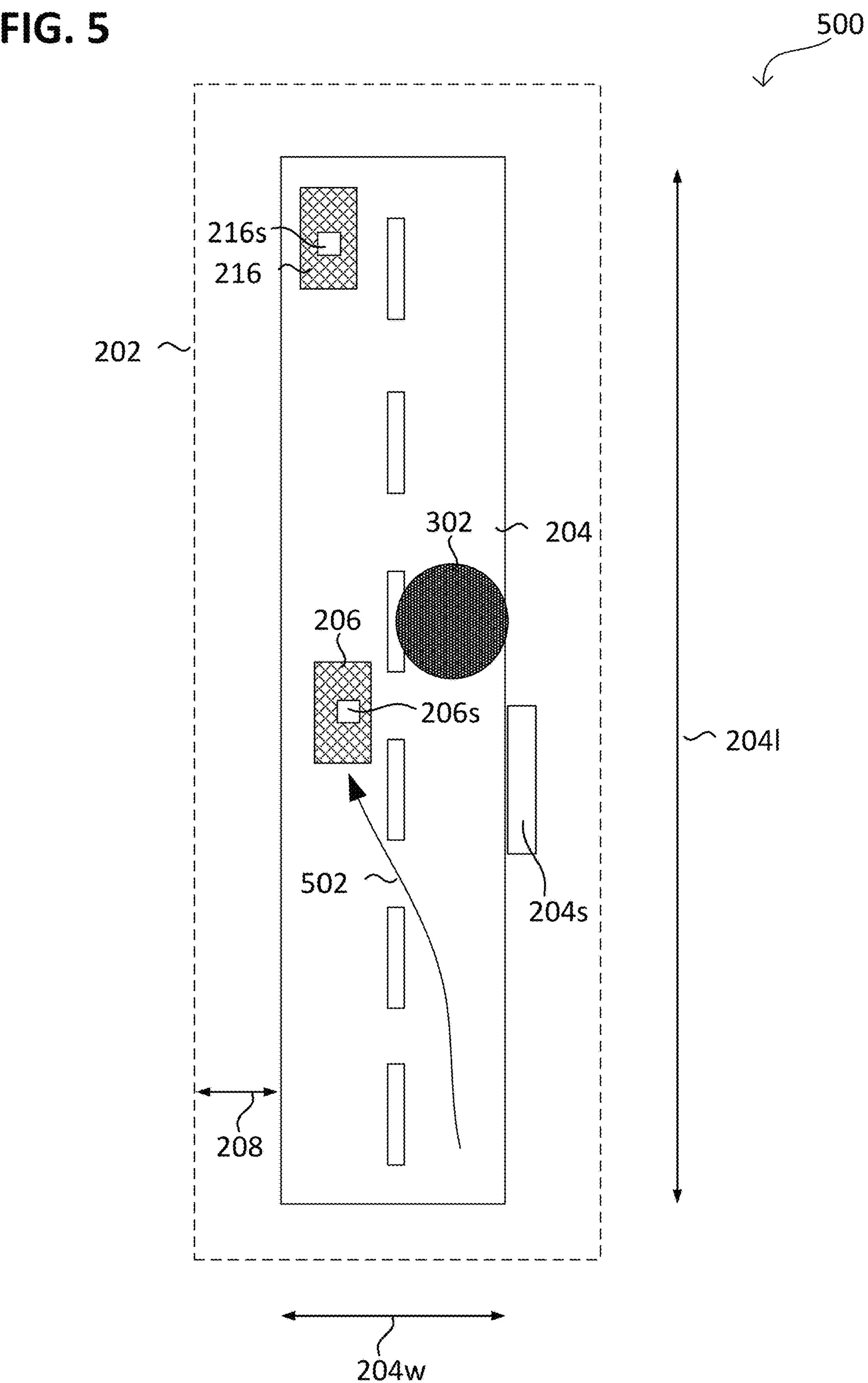

FIG. 5 illustrates a method 500 in a schematic top view, e.g., with a view direction towards ground. The method 500 may be configured for operating an AGV 206, e.g., including one of the methods 100 to 400.

The method 500 may include testing a response of the autonomous driving system of the AGV 206 (also referred as to ADS) to the obstacle 302. For testing the response of the ADS to the obstacle 302, the AGV 206 may approach the obstacle 302, e.g., having a collision course. Just as the ADS detects an unsecure state of the AGV 206 regarding the obstacle 302, the ADS may initiate a collision mitigation maneuver, e.g., an overtaking maneuver type or a collision mitigation braking.

In more general, the response of the ADS may carry out an emergency maneuver via the AGV 206, e.g., in order to avoid a collision or the like.

The method 500 may optionally include monitoring the response of the ADS, e.g., by one or more sensors. The response of the ADS may be monitored by monitoring at least one of the following trajectory parameters: the speed of the AGV 206, the position of the AGV 206, the orientation of the AGV 206, the trajectory 502 of the AGV 206. The trajectory parameter may be measured geolocational or relative to the obstacle 302.

The response of the ADS may be monitored optionally by monitoring at least one of the following system parameters: data processed by the ADS, data sensed by the one or more sensors 206*s* of the AGV 206, driving commands output by the ADS, and the like.

The response of the ADS may be monitored using the one or more internal sensors 206*s* of the AGV 206 as described above. The response of the ADS may be monitored using the one or more external sensors 216*s*, 204*s* (external to the AGV 206) as described above.

Figure 6:
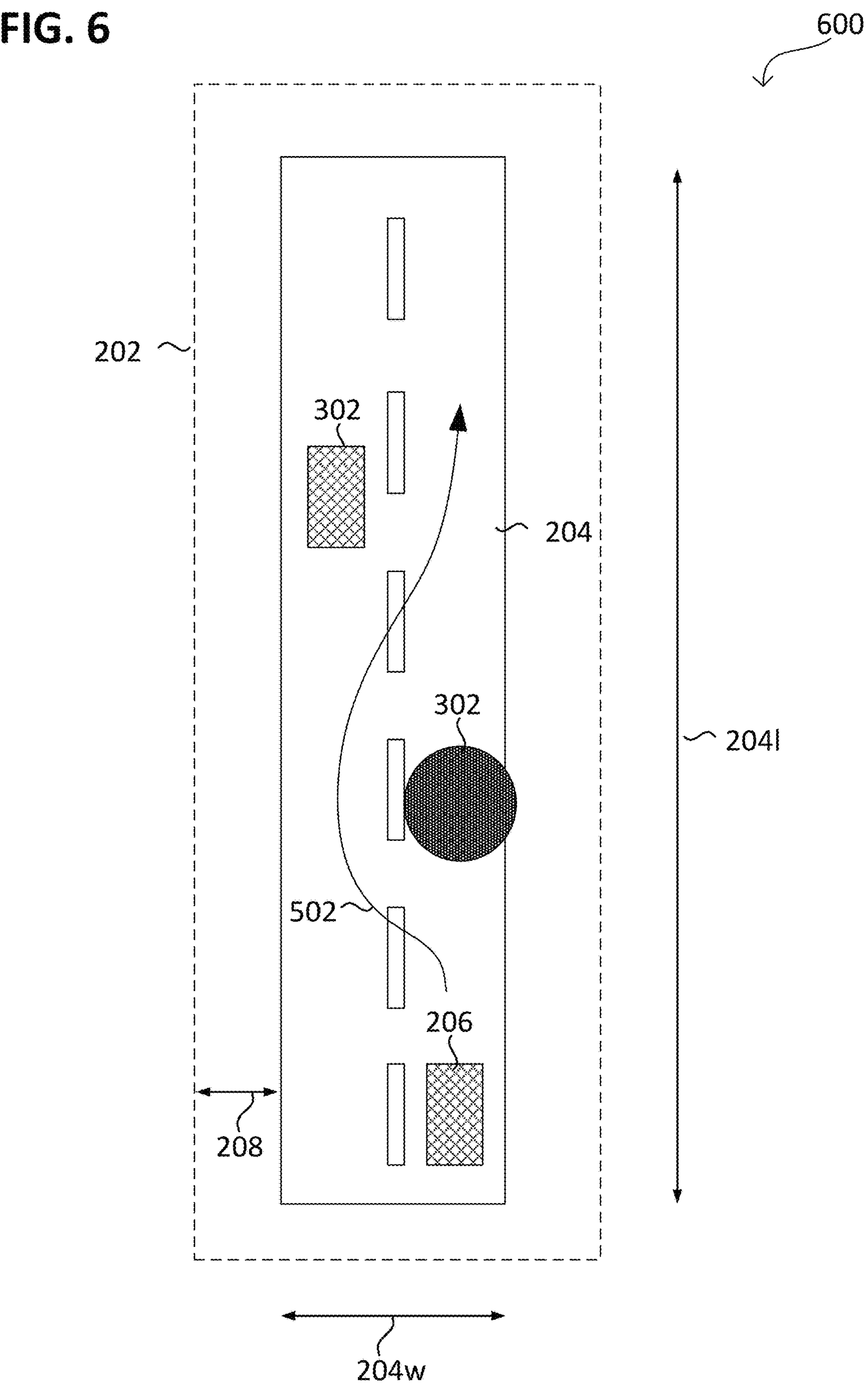

FIG. 6 illustrates a method 600 in a schematic top view, e.g., with a view direction towards ground. The method 600 may be configured for operating an AGV 206, e.g., including one of the methods 100 to 500.

The method 600 may include defining multiple obstacles 302 and testing the response of the ADS to the multiple obstacles 302. For example, multiple emergency maneuvers may be carried out after each other or simultaneously.

Optionally, the multiple obstacles 302 may include at least one virtual obstacle and at least one foreign autonomous ground vehicle 302. Illustratively, virtual and physical obstacles 302 may be mixed to enhance the DST. This enhances the complexity of the DST.

Figure 7:
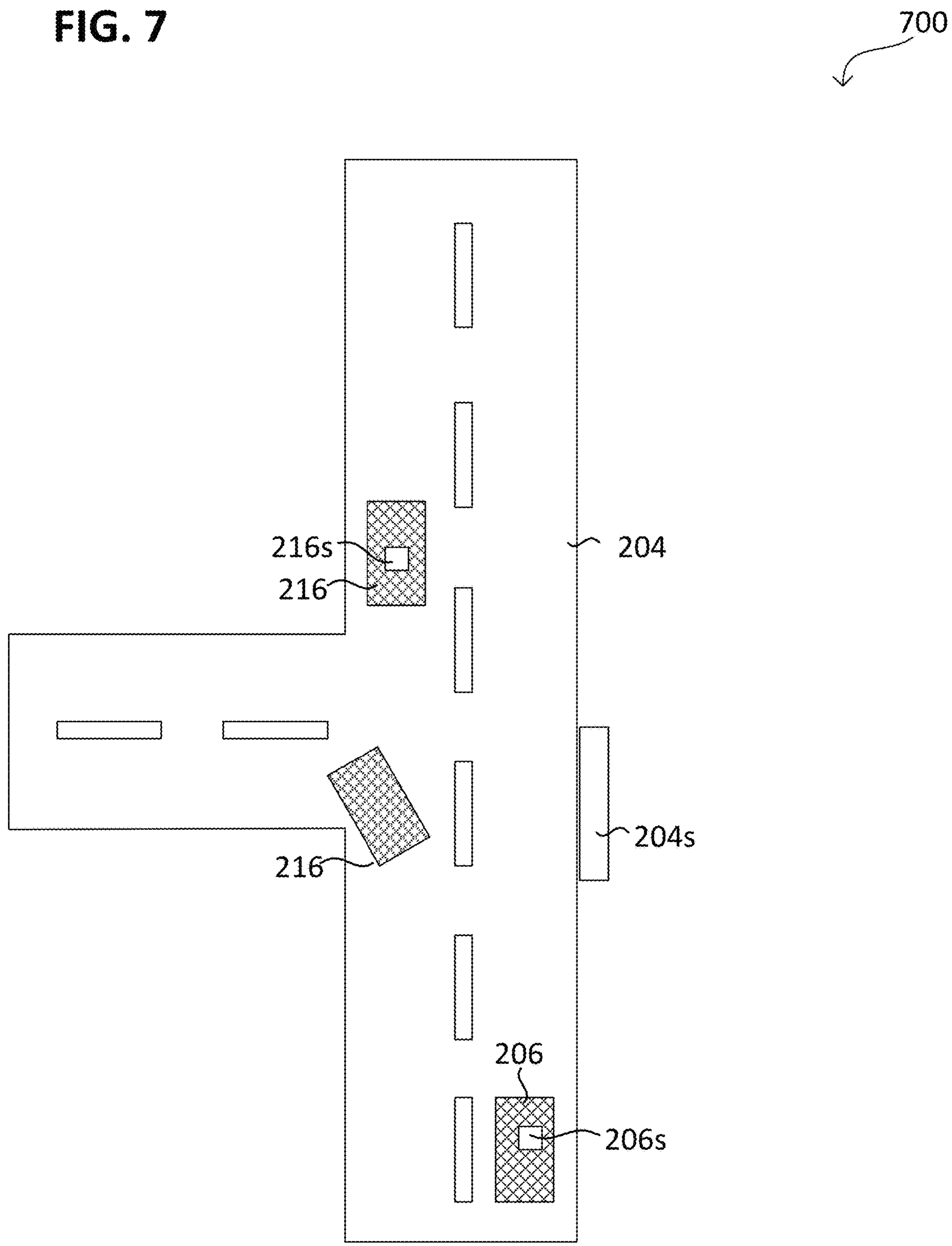

FIG. 7 illustrates a method 700 in a schematic top view, e.g., with a view direction towards ground. The method 700 may be configured for operating an AGV 206, e.g., including one of the methods 100 to 600.

The testing location of method 700 may include or be formed from a public location. A public location may be understood to be open for the public to enter or leave the location. For example, the testing location may be open for public automobile traffic or public personal traffic.

For example, the testing location may include a public road, e.g., a public highway, crossroads, a parking area, a country road, a street road or the like.

Figure 8:
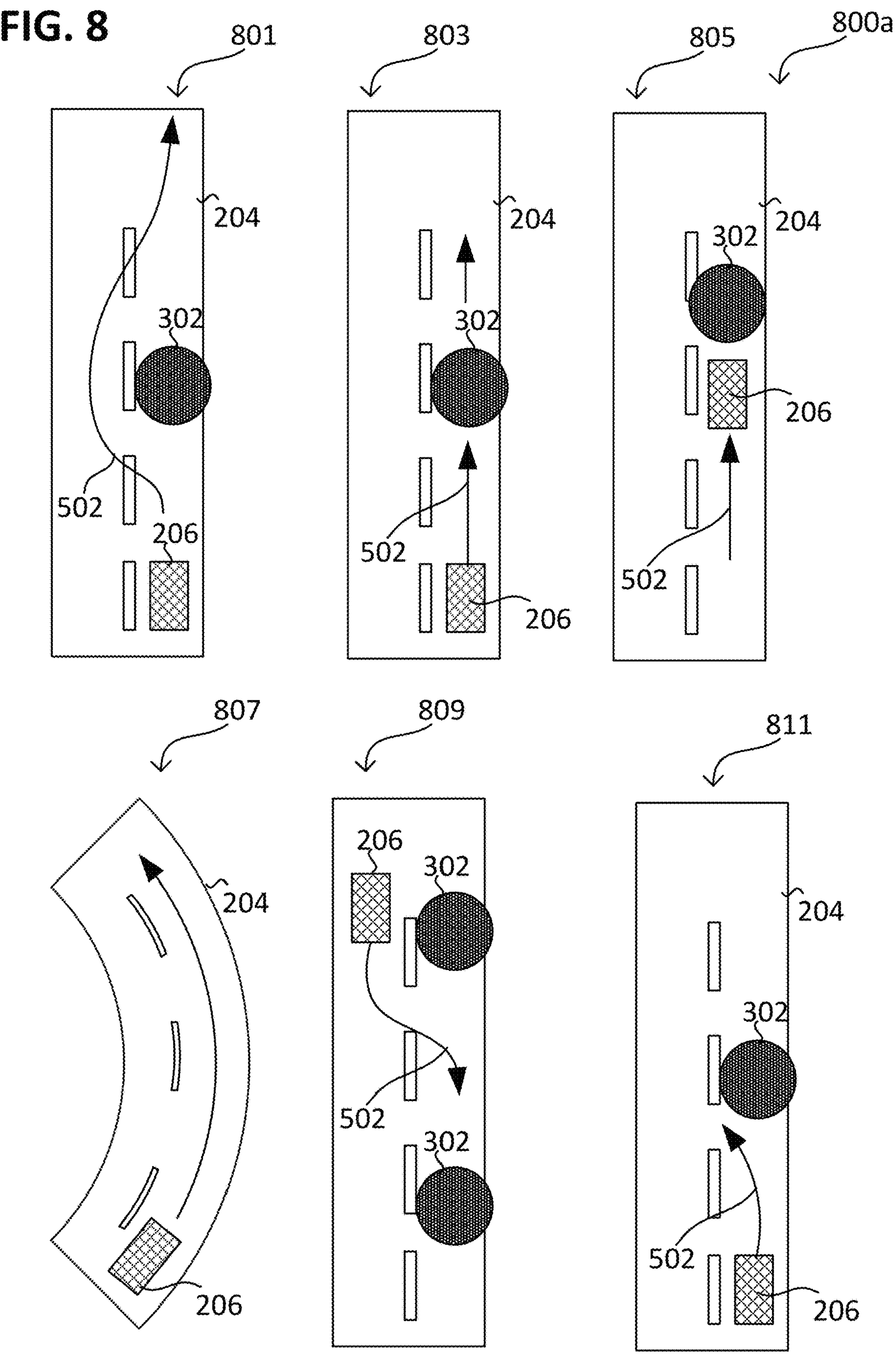

FIG. 8 illustrates a method 800 in a schematic top view, e.g., with a view direction towards ground. The method 800 may be configured for operating an AGV 206, e.g., including one of the methods 100 to 700.

The method 800 may include testing various systems of the ADS 206 and/or the corresponding software (e.g., algorithm) and/or hardware.

The method 800 may include in 801 testing an autonomous overtaking maneuver system of the autonomous ground vehicle. Thus, the DST may be of an autonomous overtaking maneuver type.

The method 800 may, additionally or alternatively, include in 803 testing an autonomous intelligent speed adaption system of the autonomous ground vehicle. Thus, the DST may be of an autonomous speed adaption type.

The method 800 may, additionally or alternatively, include in 805 testing an autonomous collision avoidance system of the autonomous ground vehicle. Thus, the DST may be of an autonomous collision avoidance type.

The method 800 may, additionally or alternatively, include in 807 testing an autonomous lane keep system of the autonomous ground vehicle. Thus, the DST may be of an autonomous lane keep type.

The method 800 may, additionally or alternatively, include in 809 testing an autonomous parking system of the autonomous ground vehicle. Thus, the DST may be of an autonomous parking type.

The method 800 may, additionally or alternatively, include in 811 testing an autonomous anti-lock braking system of the autonomous ground vehicle. Thus, the DST may be of an autonomous anti-lock braking type.

The method 800, additionally or alternatively, may include testing other systems of the ADS, e.g., autonomous collision mitigation brake system and/or autonomous cornering brake control system.

According to the applied type of DST, the method 800 may include determining an autonomous driving performance parameter. For example, the autonomous driving performance parameter may include a time to full stop, e.g., for the anti-lock braking system and/or for the autonomous collision avoidance type. Additionally or alternatively, other autonomous driving performance parameters, e.g., other time parameters, may be determined, for example, the time to complete the autonomous maneuver (e.g., the overtaking maneuver) and/or time to respond to an environmental change, e.g., if the obstacle 302 is entering the testing location and/or moving through the testing location.

Optionally, the method 800 may include determining a sensitivity parameter of one or more sensors of the ADS, which is used by the respective type of DST. For example, the method 800 may include testing the sensitivity parameter of a camera, ultrasonic sensor, a radar sensor, a microphone, a motion sensor, an approaching sensor and the like. The sensitivity parameter may be the fraction between the actual sensitivity of the respective sensor and a reference sensitivity of the respective sensor. Illustratively, the sensitivity parameter may represent the sensors actual working efficiency. The sensitivity parameter may be considered, if the ADS is to be adapted, for example, by amplifying the sensors output based on the sensitivity parameter, e.g., by the reciprocal of the sensitivity parameter.

Optionally, other parameters of the one or more sensors of the ADS may be determined, e.g., a reliability parameter of the one or more sensors. The reliability parameter of the one or more sensors may represent how reliable the one or more sensors is. For example, the reliability parameter may be the fraction between the number of correct outputs of the respective sensor and the number of incorrect or total outputs of the respective sensor.

In analogy, other parameters of the ADS may be determined optionally, e.g., a reliability parameter of the tested ADS. The reliability parameter of the tested ADS may represent how reliable the tested ADS responds. For example, the reliability parameter may be the fraction between the number of correct responses of the respective tested ADS and the number of incorrect or total response of the tested ADS.

Figure 9:
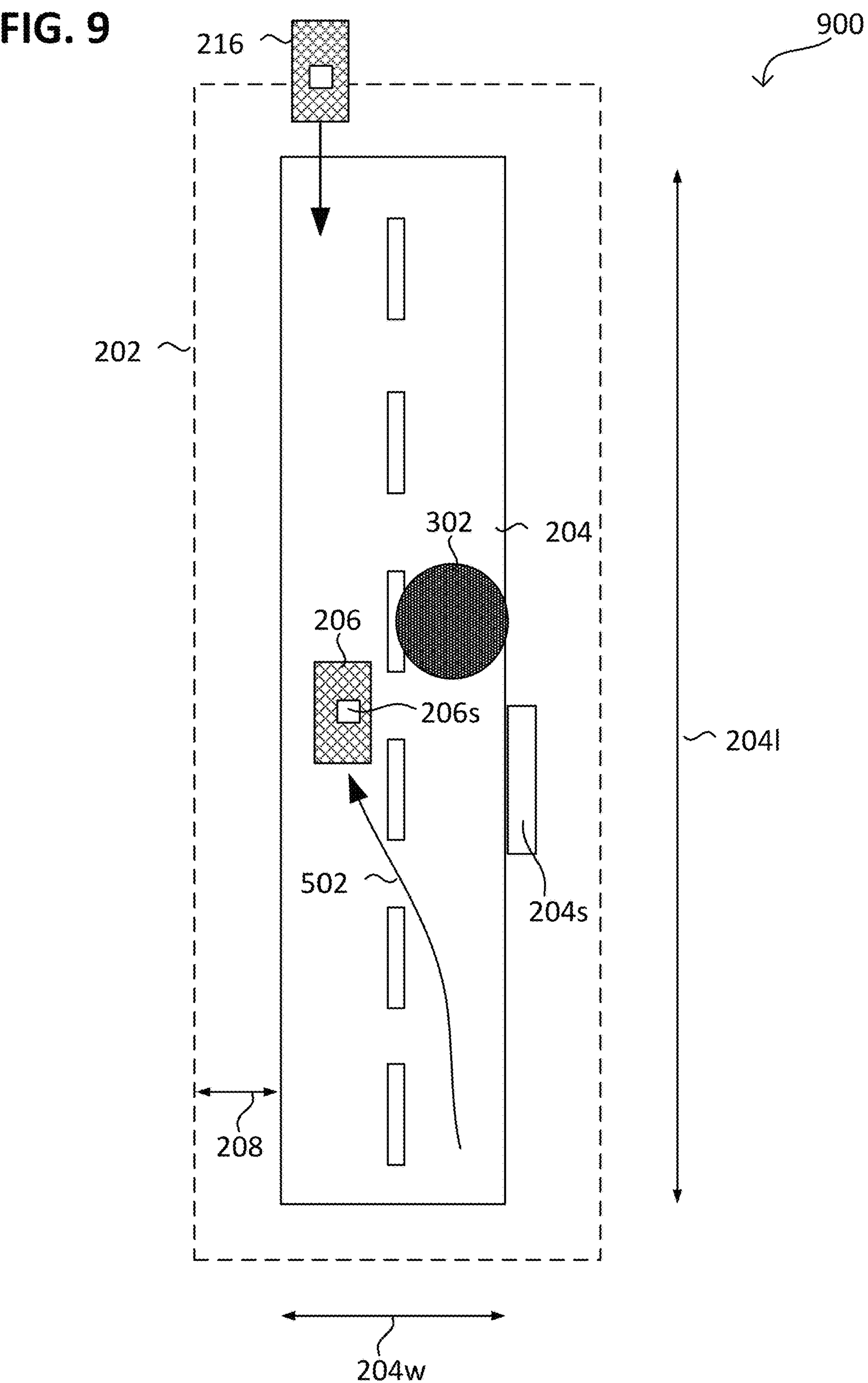

FIG. 9 illustrates a method 900 in a schematic top view, e.g., with a view direction towards ground. The method 900 may be configured for operating an AGV 206, e.g., including one of the methods 100 to 800.

The method 900 may include determining by the AGV 206 a change of the safety parameter of the testing location 202, wherein the changed safety parameter does not fulfil the safety criterion anymore. For example, the AGV 206 determines that a foreign ground vehicle 216 and/or a person enters the testing location 202, which may, for example, push the safety parameter below the safety criterion. As a response to the determination that the safety parameter does not fulfil the safety criterion anymore, the ADS may command to interrupt the testing routine, e.g., to interrupt or abort the DST.

Optionally, the safety parameter of the testing location 202 may be determined continuously throughout the whole DST. For example, the safety parameter of the testing location 202 may be determined repeatedly, e.g., 1 or more (e.g., 2 or more, e.g., 10 or more, e.g., 100 or more) times per second.

The safety parameter of the testing location 202 may be determined by sensing the environmental parameters of the testing location 202, such as presence of persons in the testing location 202.

The sensing may, for example, by carried out by one or more internal sensors **206*s* of the AGV 206 as described above. The sensing may, for example, by carried out by one or more external sensors 216*s*, 204*s*** as described above.

Additionally or alternatively, the method 900 may include determining by the AGV 206 a change of the safety parameter of the testing location 202, wherein the changed safety parameter fulfils the safety criterion anymore (again). For example, the AGV 206 determines that a foreign ground vehicle 216 and/or a person leaves the testing location 202. As a response to the determination that the safety parameter fulfils the safety criterion, the ADS may command to continue or restart the testing routine, e.g., to continue or restart the DST.

Figure 10:
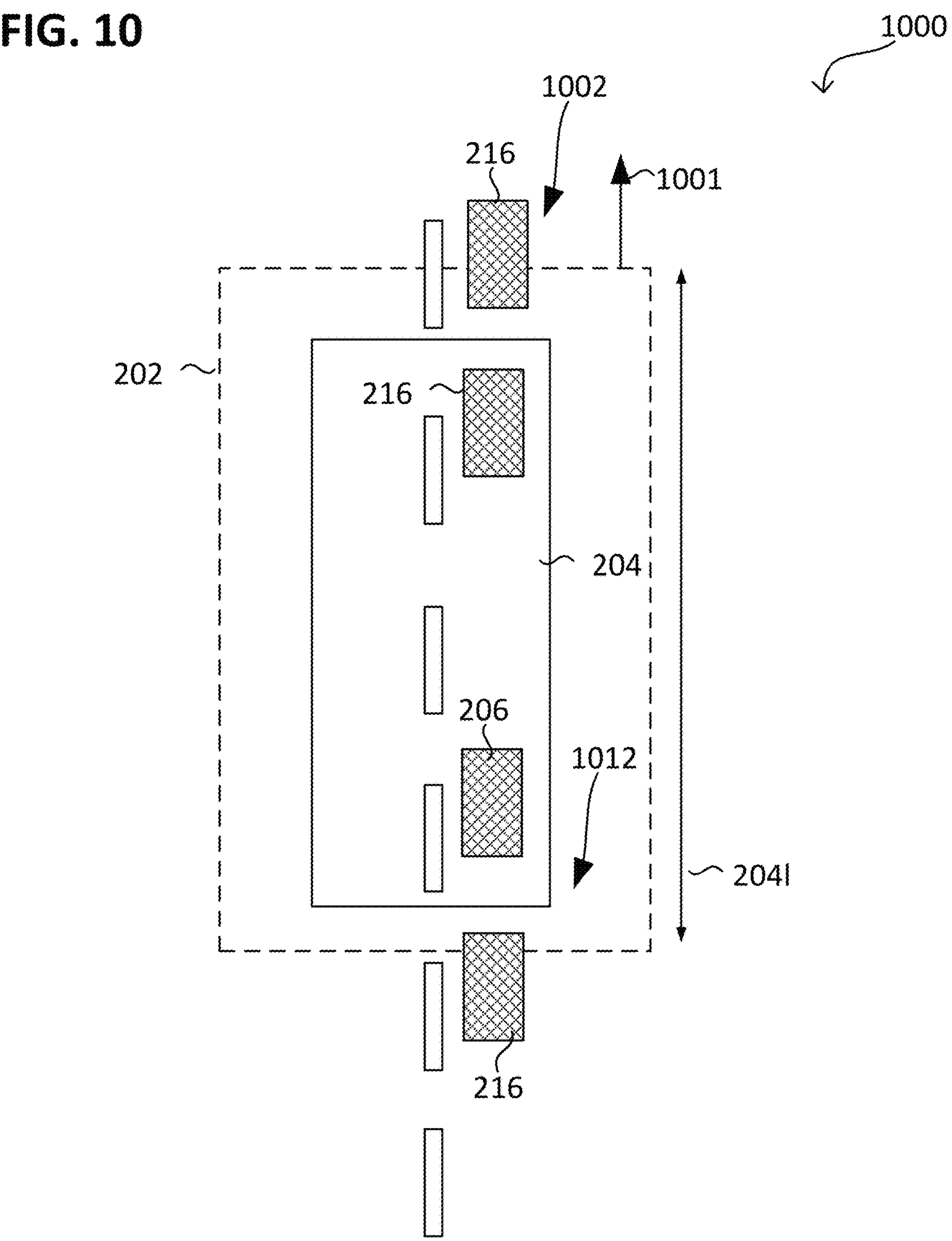

FIG. 10 illustrates a method 1000 in a schematic top view, e.g., with a view direction towards ground. The method 1000 may be configured for operating an AGV 206, e.g., including one of the methods 100 to 900.

In the method 1000, the safety parameter may represent the size of the test location 206, that is available to be free of vehicles (e.g., automobiles) and/or people. For example, the safety parameter may represent the length **204*l*** of the test location that is free of automobiles and/or people. Additionally or alternatively, the safety parameter may represent the width of the test location that is free of automobiles and/or people.

For example, the test location 202 may be stationary regarding a moving AGV 206. The AGV 206 may, for example, drive autonomously. Thus, the test location 202 may be in motion 1001 together with the AGV 206.

The method 1000 may include determining the safety parameter, e.g., the size, of the test location 202. For example, the safety parameter of the testing location 202 may be determined continuously prior to the DST. For example, the safety parameter of the testing location 202 may be determined repeatedly, e.g., 1 or more (e.g., 2 or more, e.g., 10 or more, e.g., 100 or more) times per second.

The safety parameter may, for example, be determined by sensing via the one or more sensors **106*s*, 116*s*, 204*s***, as described above.

As response to the safety parameter of the testing location 202 being determined to fulfill the safety criterion, the method 1000 may include initiating the DST. As response to the safety parameter of the testing location 202 being determined to not fulfill the safety criterion, the method 1000 may include continuing to determine the safety parameter. Additionally or alternatively, as response to the safety parameter of the testing location 202 being determined to not fulfill the safety criterion, the method 1000 may include increasing the safety parameter.

Increasing the safety parameter may include, for example, influencing the traffic surrounding the AGV 206. Influencing the traffic may be carried out, for example, by changing the moving trajectory of the AGV 206, e.g., by changing a direction of motion and/or a velocity of the AGV 206. For example, the AGV 206 may slow down to gain distance to the preceding traffic 1002, thus increasing the safety parameter.

Additionally or alternatively, influencing the traffic may include requesting one or more foreign autonomous ground vehicles 216 proximate or within the test location 202 to change their moving trajectory, e.g., their direction of motion and/or a velocity. The one or more foreign autonomous ground vehicles 216 may, for example, be part of the following traffic 1012. For example, the one or more preceding foreign autonomous ground vehicles 216 may accelerate to gain distance to the following AGV 206, thus increasing the safety parameter. Additionally or alternatively, one or more following foreign autonomous ground vehicles 216 may slow down to gain distance to the preceding AGV 206, thus increasing the safety parameter.

Increasing the safety parameter may, additionally or alternatively, include, for example, adapting the navigational route of the AGV 206, e.g., by changing the moving trajectory. For example, the AGV 206 may, for example, enter an area with lower traffic density. Adapting the navigational route may be, for example, based on traffic information received by the AGV 206.

Figure 11:
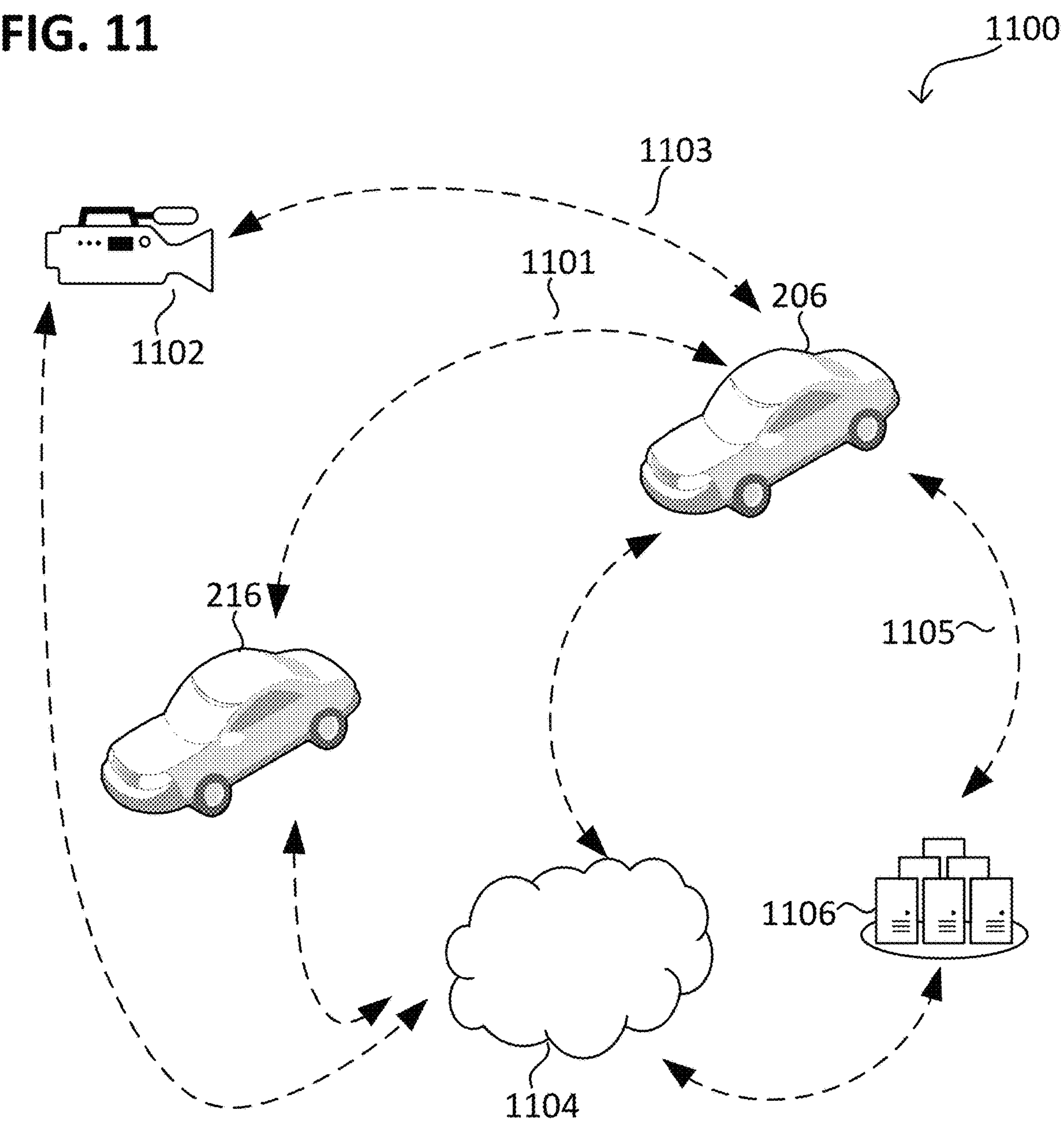

FIG. 11 illustrates a method 1100 in a schematic diagram. The method 1100 may be configured for operating an AGV 206, e.g., including one of the methods 100 to 1000.

In the method 1100, the AGV 206 may communicate 1101 with one or more foreign ground vehicles 216, e.g., one or more foreign autonomous ground vehicles 216. Additionally or alternatively, in the method 1100, the AGV 206 may communicate 1103 with one or more roadside devices 1102, e.g., one or more roadside cameras 1102. Additionally or alternatively, in the method 1100, the AGV 206 may communicate 1105 with one or more computing systems 1106, e.g., one or more servers 1106. For example, the roadside devices 1102 may include a network device and one or more external sensors, e.g., one or more cameras.

The communication 1101, 1103, 1105 may be carried out over various wireless communication types, e.g., via a network 1104 (e.g., a public network, a cellular network or the like), via a short range communication (e.g., via Bluetooth) or via direct communication (e.g., light based communication).

The communication 1101, 1103 may include requesting the one or more foreign ground vehicles 216 and/or to request the one or more roadside devices 1102 to provide sensor data. The communication 1101 may include receiving the sensor data from the one or more foreign ground vehicles 216 and/or from the one or more roadside devices 1102. The received sensor data may be processed, e.g., by the AGV 206, e.g., its ADS.

The received sensor data may be processed for determining the occupation state of the AGV 206.

Additionally or alternatively, the received sensor data may be processed for determining the test location 202.

Additionally or alternatively, the received sensor data may be processed for determining the safety parameter of the test location.

Optionally, the received sensor data may represent the DST, e.g., the performance parameter of the DST. Additionally or alternatively, the received sensor data may be processed for determining a result of the DST. That is, the received sensor data may, for example, include data from monitoring the DST. The result of the DST (also referred as to test result) may, for example, represent the performance of the ADS during the DST, e.g., represent the performance of the response of the ADS to the obstacle 302. For example, the test result may include or be formed from an autonomous driving performance parameter.

For example, the autonomous driving performance parameter may include a time parameter, e.g., the time to full stop, the time to complete the autonomous maneuver and/or the time to respond to an environmental change.

Additionally or alternatively, the communication 1101 may include requesting the one or more foreign ground vehicles 216 to participate to the DST. For example, the communication 1101 may include requesting the one or more foreign ground vehicles 216 to provide a physical obstacle 302. For example, the communication 1101 may include requesting the one or more foreign ground vehicles 216 to increase the safety parameter of the test location. For example, the communication 1101 may include requesting the one or more foreign ground vehicles 216 to monitor the DST.

The communication 1105 may include requesting the computing system 1106 to provide reference data. The reference data may be considered for determining the test result or to determining if and/or how the ADS is to be adapted.

The reference data, for example, may be provided based in a previously carried out DST of the AGV 206. This enables a determination of whether the AGV 206, e.g., its hardware, has deteriorated and/or to determine the magnitude of the deterioration. Alternatively, the reference data may be provided by the manufacture. For example, the reference data may represent the desired performance of the AGV 206.

The communication 1105 may, additionally or alternatively, include reporting data to a computing system 1106, for example, the sensing data and/or data representing the test result (also referred as to result data). For example, the data reported to the computing system 1106 may include monitored data of the DST.

The method 1100 may optionally include processing the data by the computing system 1106. For example, the sensing data may be processed to determine the test result and/or to determine if and/or how the ADS is to be adapted.

In general, the computing system 1106 may include one or more processors, one or more memories, and/or one or more network connections.

The computing system 1106 may compare the reported data with data stored by the computing system 1106, e.g., with reference data stored by the computing system 1106. Based on the comparing, the computing system 1106 may determine, if the ADS operates normal or abnormal. For example, based on the comparing, the computing system 1106 may determine, if present, a deviation of the data from the stored data (also referred as to deviation parameter). Based on the deviation parameter, the computing system 1106 may determine, if the ADS operates normal and/or abnormal. For example, in response the determination that the ADS operates abnormal, instruction information (e.g., adaption instructions) may be provided by the computing system 1106.

The computing system 1106 may be external to the AGV 206. For example, the computing system 1106 may include a server of the manufacturer or of a service provider. Alternatively, the computing system 1106 may be integrated in the AGV 206, e.g., integrated in the ADS. For example, the computing system 1106 may include or be formed from the internal computer system of the AGV 206.

Optionally, the communication 1105 may include sending the instruction information to the ADS. The instruction information may be provided by the computing system 1106 external to the AGV 206, for example, by processing the data reported to the computing system 1106 via the communication 1105. Alternatively the instruction information may be provided by the computing system 1106 of the AGV 206, e.g., by processing the data reported to the computing system 1106.

The instruction information may be provided by a machine learning algorithm of the computing system 1106. For example, the machine learning algorithm may process the data reported to the computing system 1106, e.g., the sensing data or result data, and provide instructions to adapt (also referred as to adaption instructions) the ADS.

For example, the instruction information may include instructions to set up a service schedule. The service schedule may, for example, include one or more appointments for maintenance or other services applied to the AGV 206, e.g., its ADS. Illustratively, if the testing result reveals the ADS operates normal, the instruction information may command the AGV 206 to plan and alert one or more subsequent DST.

For example, the instruction information may include instructions to set up navigational destination information. The navigational destination information may, for example, include one or more geolocational destination for autonomously routing the AGV 206, e.g., via its ADS. Illustratively, if the testing result reveals the ADS operates defective, the instruction information may command the AGV 206 to set up a route to a maintenance provider.

For example, the instruction information may include instructions to restart the DST. Illustratively, if the testing result reveals the DST failed or is otherwise non-reliable, the instruction information may command the AGV 206 to repeat the DST or a DST of another type. Additionally or alternatively, if the testing result reveals the ADS operates normal, the instruction information may command the AGV 206 to continue with one or more DST of another type.

Figure 12:
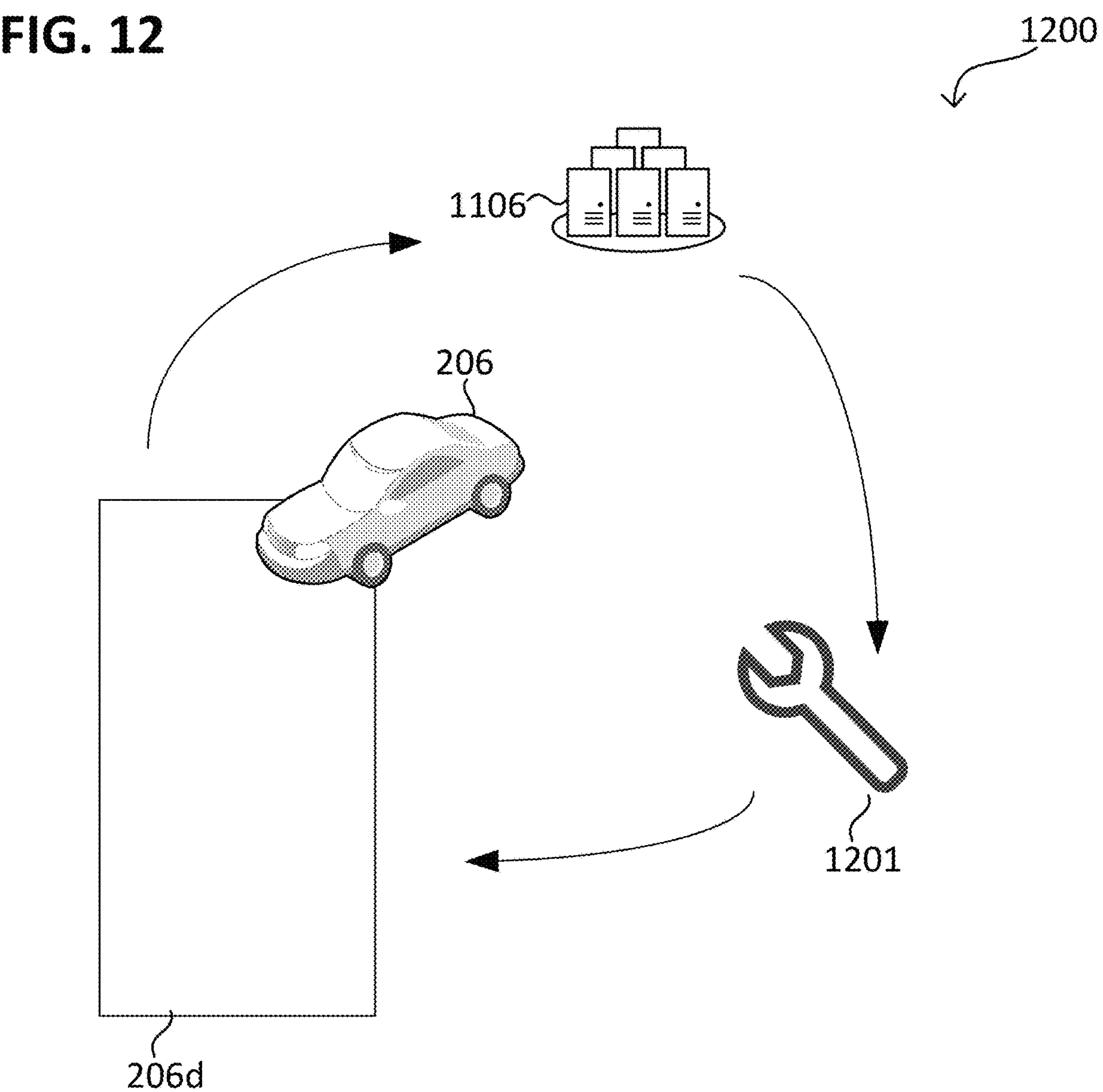

FIG. 12 illustrates a method 1200 in a schematic diagram. The method 1200 may be configured for operating an AGV 206, e.g., including one of the methods 100 to 1100.

The instruction information of method 1200 may include instructions to adapt the ADS 206*d* (also referred as to adaption instructions 1201). For example, the adaption instructions 1201 may be configured to instruct adapting the software of the ADS, e.g., one or more algorithm and/or one or more operating parameters of the ADS (also referred as to autonomous driving parameters).

Optionally, the adaption instructions may be provided by the machine learning algorithm.

For example, the adaption instructions may instruct to adapt one or more autonomous driving parameters of the ADS 206*d* such that the deviation parameter is reduced, e.g., such that the deviation of the response of the ADS from a reference response may be reduced. This enables to compensate, for example, a deterioration of the AGV 206, e.g., of its hardware.

Optionally, in response to adapting the ADS 206*d*, the adaption instructions may instruct to repeat or carry out a new the DST. This enables to determine the effect of the adaption.

Figure 13:
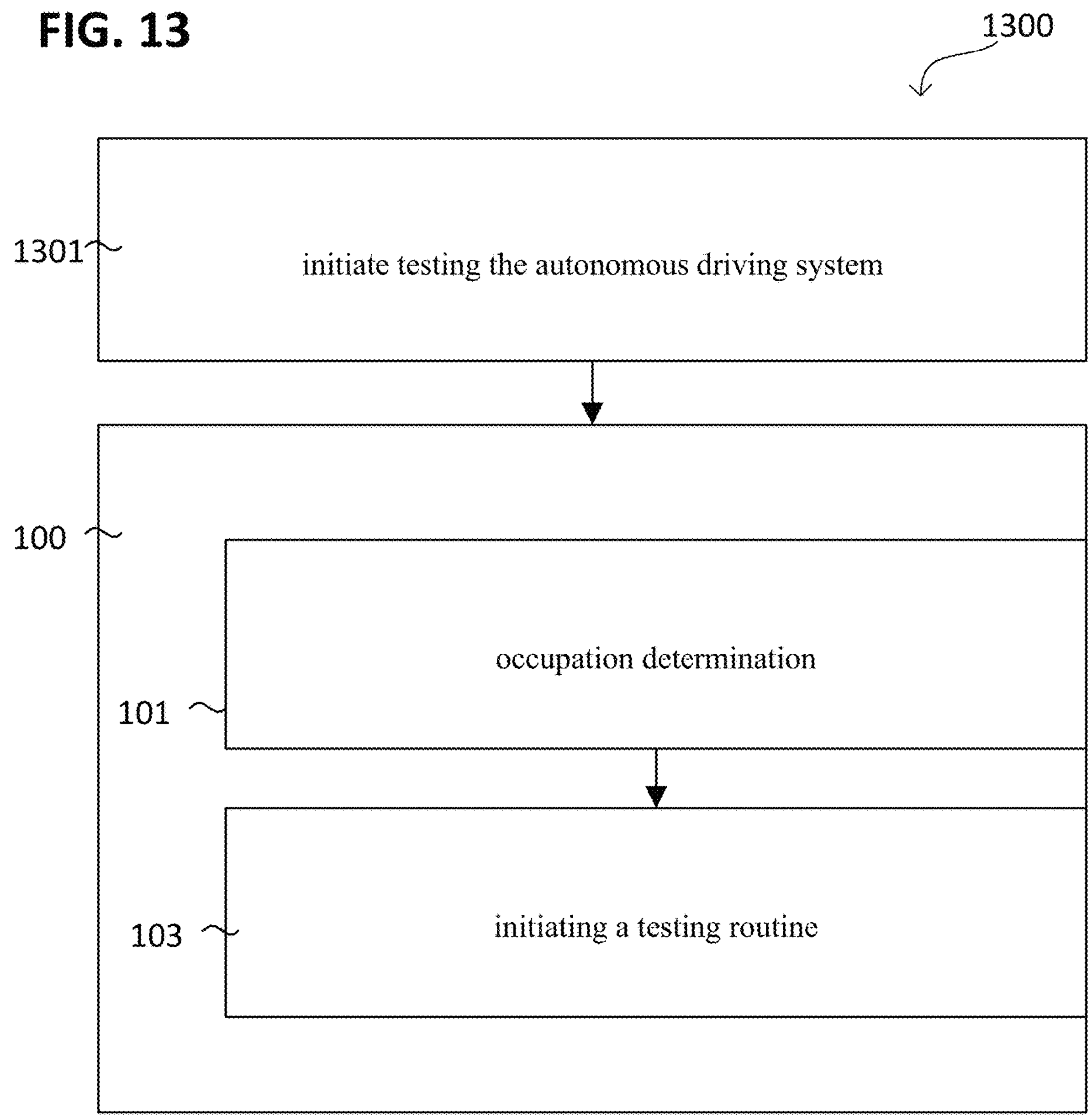

FIG. 13 illustrates a method 1300 in a schematic flow diagram. The method 1300 may be configured for operating an AGV 206, e.g., including one of the methods 100 to 1200.

The method 1300 may include in 1301 initiating the testing of the ADS. The method 1300 may include in 100, in response to the initiating 1301, determining 101 an occupation state of the AGV 206. The method 1300 may include in 100, in response to determining the occupation being unoccupied, initiating 103 the testing routine.

In general, the testing of the ADS may be initiated by a system of the AGV 206 or a system external of the AGV 206 (also referred as to external system).

For example, the testing of the ADS may be initiated in response to an external request received by the AGV 206 from the external system, e.g., from the computing systems 1106 external to the AGV 206.

Additionally or alternatively, the testing of the ADS may be initiated in response to the AGV 206 detecting an initiating event, e.g., an environmental related event, a schedule event, a sensor reliability related event or an autonomous driving performance related event.

Additionally or alternatively, the testing of the ADS may be initiated in response to completing a software update of the ADS. Illustratively, the software update may change one or more parameters and/or one or more algorithms of the ADS. In response, the DST may reveal, if the updated ADS operates normal or abnormal.

Additionally or alternatively, the testing of the ADS may be initiated by a user command. For example, the owner of the AGV 206 may initiate the DST. Additionally or alternatively, a human maintenance provider may initiate the DST. Optionally, the user command may request an authentication of the commanding user, e.g., a personal pin, an authentication code or the key code to the AGV 206.

For example, the external request may be received from a vehicle service provider (e.g., the manufacturer). Additionally or alternatively, the external request may be received by an insurance provider.

Additionally or alternatively, in response to a foreign ground vehicle 216 detecting that the ADS operates abnormal, the foreign ground vehicle 216 may send the external request to the AGV 206. Illustratively, the foreign ground vehicle 216 may monitor the performance of the AGV 206 operating in the autonomous operating mode and may alert the AGV 206 if the autonomous operating behaves abnormal.

The method 1300 may include, in response to determining the occupation state of the AGV 206 being occupied, postponing the testing routine, e.g., by a predefined period and/or to a point of time. Postponing the testing routine may include setting up a schedule event representing the period or point of time of the postponing. Illustratively, the AGV 206 may test the ADS later, if the commanding user or the driver occupies the AGV 206.

Figure 14:
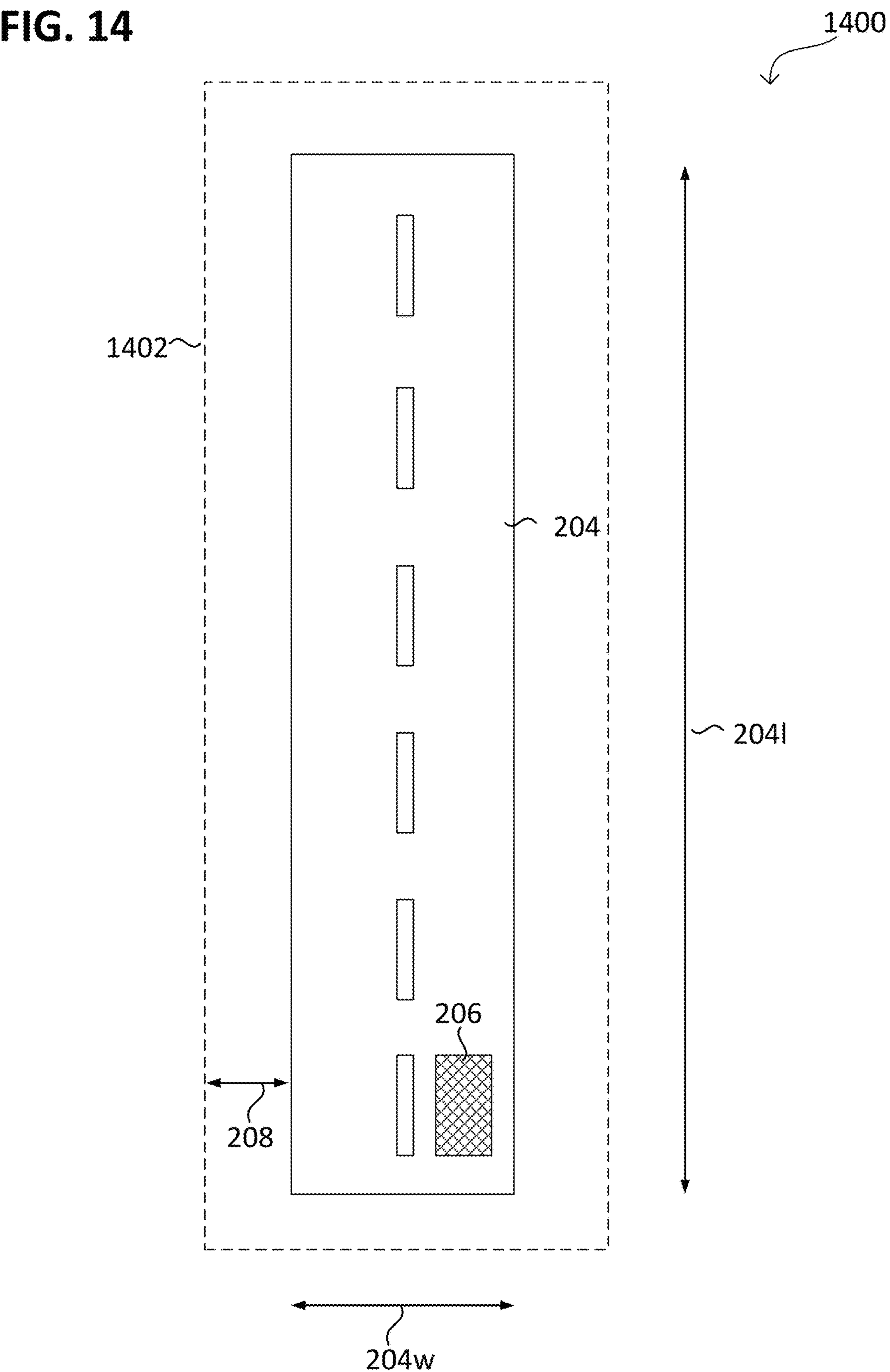

FIG. 14 illustrates a method 1400 in a schematic top view, e.g., with a view direction towards ground. The method 1400 may be configured for operating an AGV 206, e.g., including one of the methods 100 to 1300.

The method 1400 may include that the AGV 206 monitors one or more environmental parameters of the AGV 206, e.g., of an environmental location 1402. The one or more environmental parameters may, for example, include the number of individuals proximate the AGV 206 and/or in the environmental location 1402. The one or more environmental parameters may, for example, include one or more road 204 related parameters of the environmental location 1402, such as, for example, the length **204*l* of the road 204, the width 204*w* of the road 204 and/or the path of the road 204. The one or more environmental parameters may, for example, include one or more traffic related parameters in the environmental location 1402, such as distance to the preceding traffic 1002 and/or to the following traffic 1012. The one or more environmental parameters may, for example, include the number of foreign ground vehicles proximate the AGV 206 and/or in the environmental location 1402. The one or more environmental parameters may, for example, include the type of environmental location 1402, such as urban environment, rural environment, highway environment, and the like. The one or more environmental parameters may, for example, include the size of environmental location 1402 that is free of persons and/or free of foreign ground vehicles. The one or more environmental parameters may, for example, include the spatial density of persons and/or foreign ground vehicles proximate the AGV 206 and/or in the environmental location 1402**. Optionally, other environmental parameters may be monitored.

Monitoring the one or more environmental parameters of the AGV 206 may be carried out by one or more internal sensors **206*s* of the AGV 206. Additionally or alternatively, monitoring the one or more environmental parameters of the AGV 206 may be carried by the one or more external sensors 216*s*, 204*s***.

The method 1400 may include, determining a suitability parameter of the environmental location based on the one or more environmental parameters. Illustratively, the suitability parameter may represent (e.g., rates) the suitability of the environmental location of the AGV 206 to be the testing location. For example, the suitability parameter may be determined identical to the safety parameter.

The method 1400 may include, setting the at least one environmental location as the determined test location in response to the suitability parameter of the environmental location fulfills a suitability criterion. For example, the suitability criterion may be similar to the safety parameter.

The method 1400 may include, triggering the environmental related event in response to the suitability parameter of the environmental location fulfills a suitability criterion. Illustratively, the ADS may be informed that the environmental location is suitable for carrying out the DST.

In the method 1400 the environmental location is the current location of the AGV 206. Alternatively, the environmental location may be distant from the AGV 206. Thus, the ADS may be informed that a distant environmental location is suitable for carrying out the DST and may set up an autonomous route to the distant environmental location.

For example, the environmental location may be identified by one or more processors (e.g., by the AGV 206) based on geolocational, navigational or traffic information received and/or requested one or more processors (e.g., by the AGV 206). Illustratively, the one or more processors (e.g., the AGV 206) may actively search for one or more potential test locations. Additionally or alternatively, one or more processors (e.g., the AGV 206) may be informed about one or more potential test locations, e.g., by the external computing system 1106.

Figure 15:
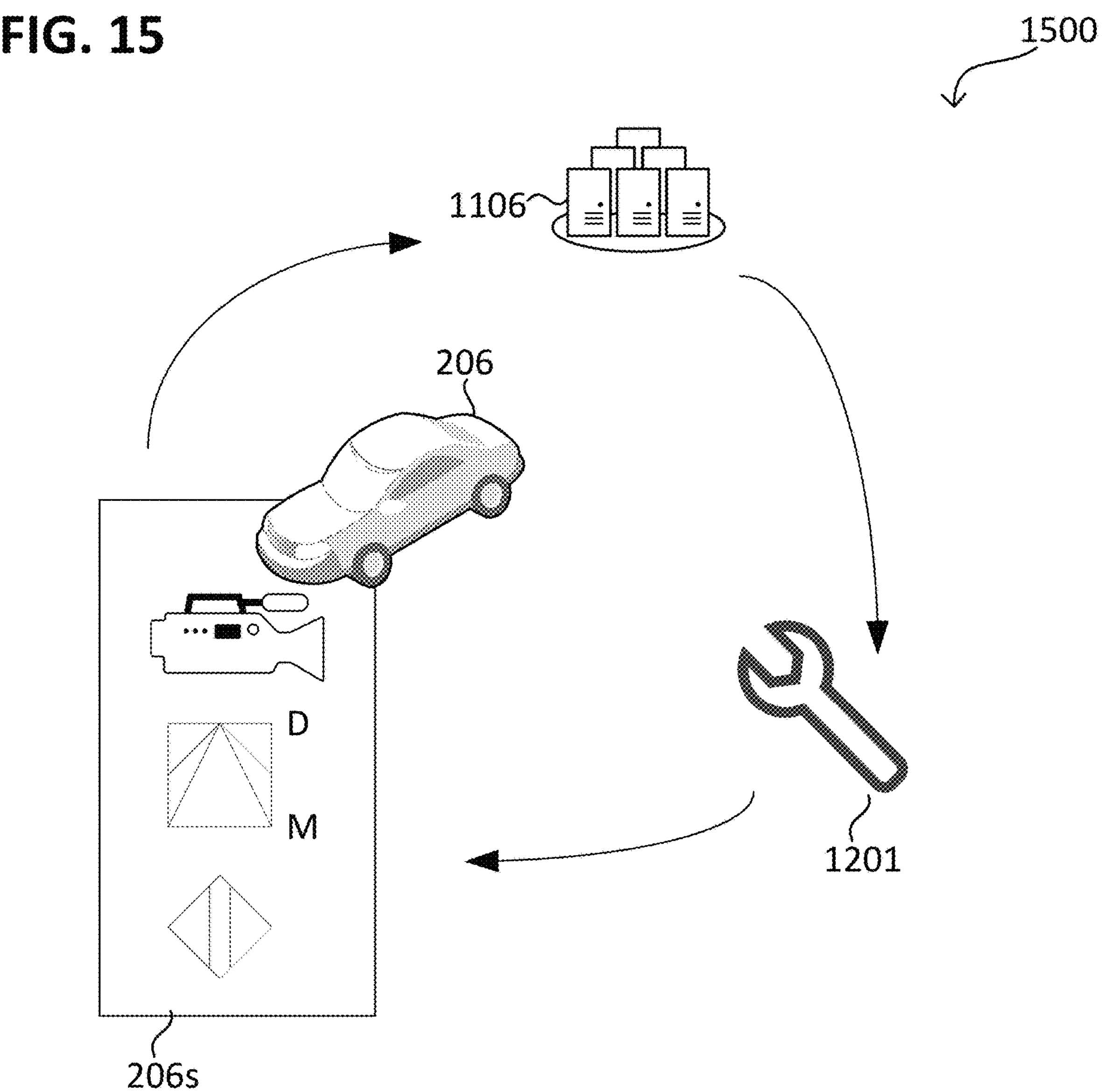

FIG. 15 illustrates a method 1500 in a schematic top view, e.g., with a view direction towards ground. The method 1500 may be configured for operating an AGV 206, e.g., including one of the methods 100 to 1400.

The one or more internal sensors **206*s* of the AGV 206** may include one or more infrared sensors, one or more cameras, one or more microphones, one or more motion sensors, one or more ultrasonic sensors, one or more radar sensors, one or more seat occupation sensors, one or more approaching sensors, one or more geolocation sensors (e.g., including an GPS-sensor), and the like.

The method 1500 may include determining a sensor reliability parameter of at least one sensor 206*s* (that is one or more or all sensor 206*s*) of the autonomous ground vehicle, e.g., during the DST. Additionally or alternatively, the reliability parameter may be monitored, e.g., during the AGV 206 operating in the autonomous mode or in the manual operation mode, e.g., continuously. The reliability parameter may represent deviations or disturbances of the at least one sensor 206*s*. For example, the reliability parameter may include the deviation outputs of the at least one sensor in response to the same or equal conditions.

The method 1500 may include triggering the sensor reliability related event (e.g., to initiate the DST) in response to the reliability parameter fulfilling a predefined criterion (also referred as to reliability criterion). Illustratively, if the at least one sensor 206*s* is detected to operate abnormal, irregular or inconsistent, the reliability related event may be triggered by the AGV 206.

Determining a sensor reliability parameter may include, for example, processing the sensor data from the at least one sensor, e.g., by the one or more computing systems 1106.

Additionally or alternatively, determining a sensor reliability parameter may include, receiving, by the AGV 206, the external request, e.g., from the foreign ground vehicle 216. Illustratively, in response to the foreign ground vehicle 216 detecting that the AGV 206 operates abnormal, the foreign ground vehicle 216 may send the external request to the AGV 206. For example, the foreign ground vehicle 216 may monitor the performance of the AGV 206 operating in the autonomous operating mode.

Figure 16:
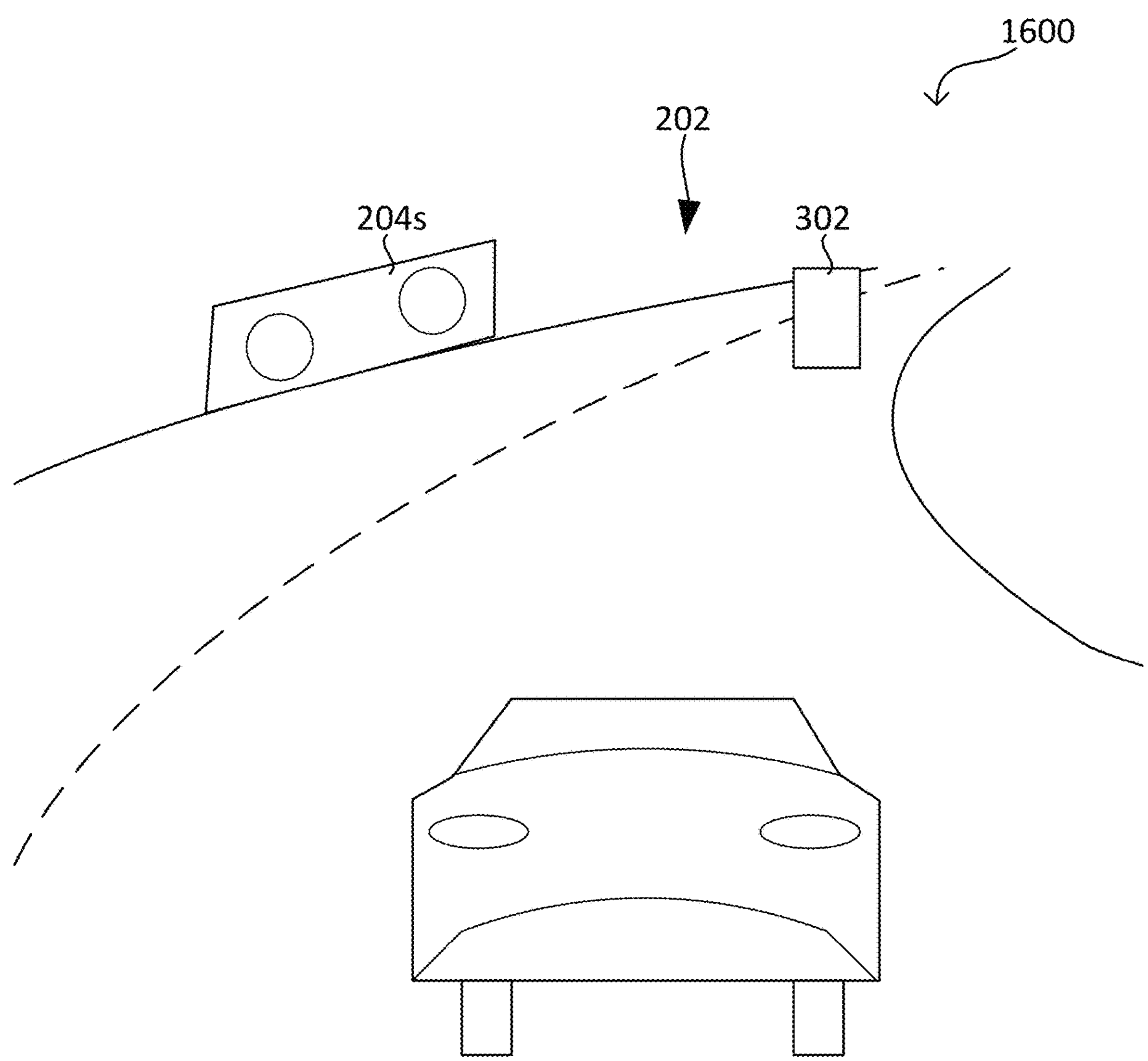

FIG. 16 illustrates a method 1600 in a schematic perspective view, e.g., with a view along the direction of movement of the AGV 206. The method 1600 may be configured for operating the AGV 206, e.g., including one of the methods 100 to 1500.

In the method 1600, an internal sensor array of the AGV 206 ensures there are no passengers in the AGV 206 while one or more roadside sensor arrays 204*s* monitor surrounding traffic to ensure conditions are safe to test the ADS. Once it is decided that it is safe to perform one or more DST, a test location 202 to carry out the one or more DTS may be reported to the AGV 206 and a virtual obstruction 302 is generated at the test location 202. One or more test results may be optionally monitored and reported by one or more sensors on the AGV 206, one or more roadside sensors 204*s*, one or more sensors on other vehicles, and the like.

The roadside sensor arrays 204*s* may, for example, include one or more cameras, one or more microphone, and the like.

Figure 17:
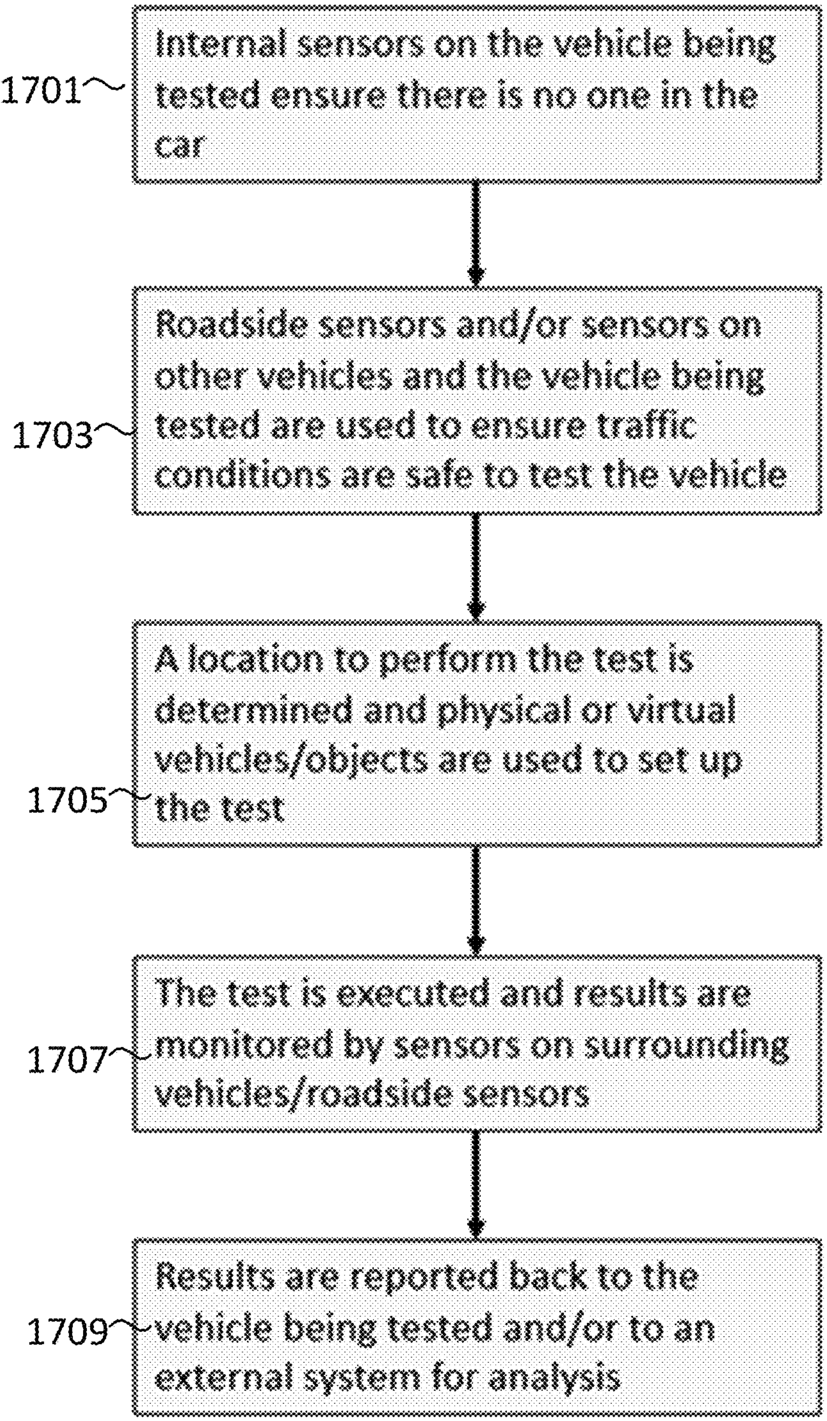

FIG. 17 illustrates a method 1700 in a schematic flow diagram. The method 1700 may be configured for operating an AGV 206, e.g., including one of the methods 100 to 1600.

The method 1700 may include in 1701, determine that no passenger is in the AGV 206 by one or more internal sensors of the AGV 206.

The method 1700 may include in 1703, determine that the traffic conditions are safe for testing the ADS via one or more sensors of the roadside, of one or more other vehicles and one or more sensors of the AGV 206.

The method 1700 may include in 1705, determine a location to perform the DST (also referred as to test location) and setting up the DST by one or more physical or virtual vehicle and/or by one or more physical or virtual object.

The method 1700 may include in 1707, executing the DST and monitoring the DST by one or more sensors of one or more proximate vehicles and/or of one or more proximate roadside.

The method 1700 may include in 1709, reporting a result of the DST back to the AGV 206 and/or to an external system for analysis.

Figure 18:
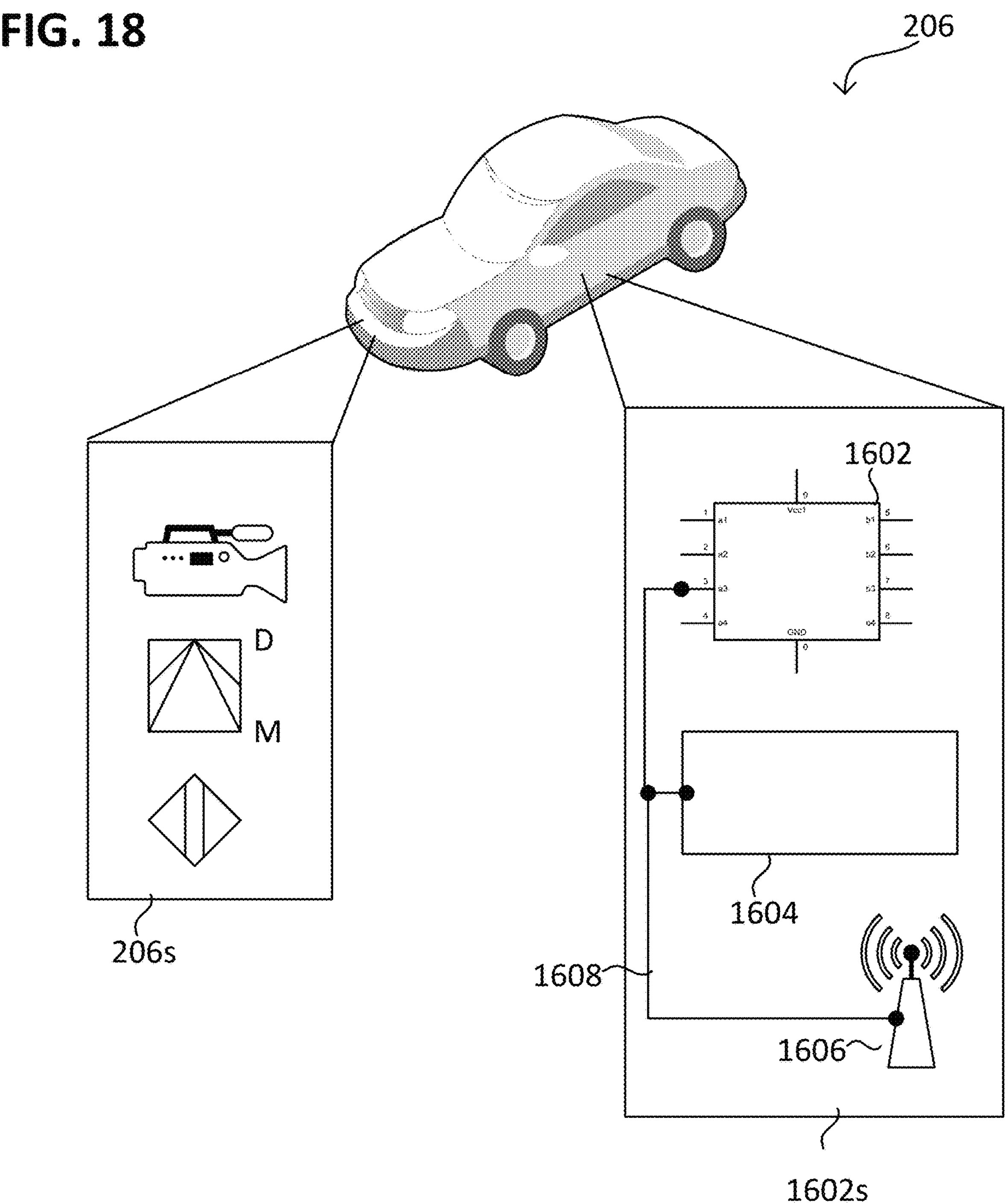
FIG. 18 shows an autonomous ground vehicle.

FIG. 18 illustrates an AGV 206 in a schematic perspective view. The AGV 206 may include one or more processors 1602 configured to perform the method described herein. The one or more processors 1602 may be part of a circuit 1602*s* of the AGV 206.

For example, the computing system 1106 above may include the one or more processors 1602. Additionally or alternatively, the circuit 1602*s* of the AGV 206 may include the ADS 206*d*. For example, the ADS 206*d* may include the one or more processors 1602.

The circuit 1602*s* of the AGV 206 may further include one or more memories 1604, one or more network connections 1604 and/or one or more bus systems 1808.

Figure 19:
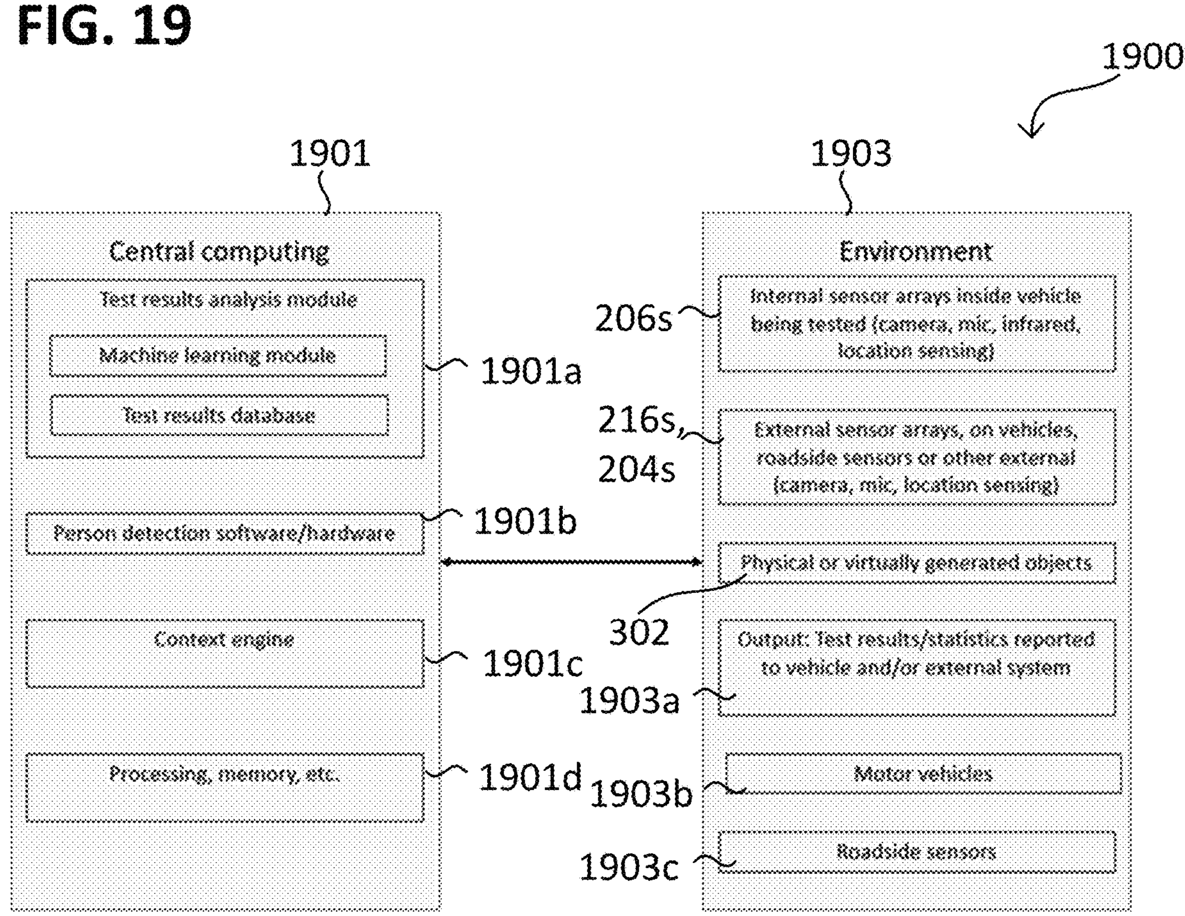
FIG. 19 shows a system.

FIG. 19 illustrates a system 1900 for carrying out one of the methods 100 to 1700 as described herein, e.g., by operating an AGV 206, in a schematic diagram.

The system 1900 may include multiple subsystems 1901, 1903 that are communicatively connected to each other, e.g., wireless or wired. The system 1900 may include a central computing subsystem 1901, e.g., including the computing system 1106 and/or the circuit 1602*s*. The system 1900 may further include an environmental subsystem 1903.

The central computing subsystem 1901, e.g., the computing system 1106 and/or the circuit 1602*s*, may include a test result analysis module 1901*a*, a person detection module 1901*b*, a context engine, and at least one processing module 1901*d*.

The person detection module may be implemented by hardware and/or software. The at least one processing module 1901*d* may include one or more processors, one or more memories, one or more storage units.

The modules of the central computing system 1901 may be cloud-based, edge server-based, end user device-based, and the like.

The environmental subsystem 1903 may include one or more sensors 206*s* of the AGV 206, that is, for example, inside the vehicle to be tested. The one or more sensors 206 of the AGV 206 may include at least one of the following sensors: at least one camera, at least one microphone, at least one infrared sensor, at least one location sensor.

The environmental subsystem 1903 may include one or more sensors 216*s*, 204*s* external to the AGV 206, that is, for example, distant form the AGV 206 to be tested. The one or more sensors 206 external to the AGV 206 may include one or more roadside sensors 204*s* and/or one or more sensors of one or more other vehicles 216. The one or more sensors 206 external to the AGV 206 may include at least one of the following sensors: at least one camera, at least one microphone, at least one infrared sensor, at least one location sensor.

The environmental subsystem 1903 may include one or more obstacles 302, e.g., one or more virtual obstacles 302 and/or one or more physical obstacles 302.

The environmental subsystem 1903 may include an output 1903*a*, which is configured for reporting the test results (e.g., test statistics) to the AGV 206 and/or to a computing system 1106 external to the AGV 206.

The environmental subsystem 1903 may optionally include one or more foreign motor vehicles 216, e.g., cars, motorcycles, trucks, buses and the like.

The environmental subsystem 1903 may optionally include one or more roadside sensors.

Further, various aspects of this disclosure will be described in the following.

Example 1 is a method for operating an AGV 206, the method including:

via one or more processors, determining an occupation state of the autonomous ground vehicle;

if the occupation state is unoccupied, autonomously initiating a testing routine, the testing routine including:

determining a test location, determining a safety parameter of the test location; and if the safety parameter fulfils a safety criterion, testing an autonomous driving system of the autonomous ground vehicle in the test location.

Example 2 is a method for operating an AGV 206, the method including:

via one or more processors, determining an occupation state of the autonomous ground vehicle;

if the occupation state is unoccupied, determining a test location, determining a safety parameter of the test location;

if the safety parameter of the test location fulfils a safety criterion, testing an autonomous driving system of the autonomous ground vehicle in the test location.

In Example 3, the subject matter of Example 1 or 2 can optionally include that testing the autonomous driving system includes:

defining a virtual obstacle;

testing a response of the autonomous driving system to the virtual obstacle.

In Example 4, the subject matter of any one of Examples 1 to 3 can optionally include that testing the autonomous driving system includes:

defining a physical obstacle;

testing a response of the autonomous driving system to the physical obstacle.

In Example 5, the subject matter of Examples 4 can optionally include that the physical obstacle is provided by another autonomous ground vehicle.

In Example 6, the subject matter of Example 5 can optionally include: requesting by the autonomous vehicle for the another autonomous ground vehicle to provide the obstacle.

In Example 7, the subject matter of any one of Examples 1 to 6 can optionally include that the testing location is a public location.

In Example 8, the subject matter of any one of Examples 1 to 7 can optionally include that the testing location is open for public automobile traffic or public personal traffic.

In Example 9, the subject matter of any one of Examples 1 to 8 can optionally include that testing the autonomous driving system includes testing of at least one of the following autonomous systems:

collision avoidance system;

lane keep assist system;

parking system;

intelligent speed adaption system;

anti-lock braking system;

overtaking maneuver system;

collision mitigation brake system; and/or cornering brake control.

In Example 10, the subject matter of any one of Examples 1 to 9 can optionally include that testing the autonomous driving system includes determining of at least one of the following parameters:

time to full stop;

a sensitivity parameter of one or more sensors of the autonomous driving system;

a reliability parameter of one or more sensors of the autonomous driving system;

time to complete a predefined autonomous maneuver; and/or time to respond to an environmental change;

In Example 11, the subject matter of any one of Examples 1 to 10 can optionally include that testing the autonomous driving system includes testing a hardware of the autonomous ground vehicle, a software of the autonomous ground vehicle, or testing both.

In Example 12, the subject matter of any one of Examples 1 to 11 can optionally include that, if the safety parameter does not fulfil the safety criterion, the autonomous ground vehicle is commanded to interrupt the testing routine until the safety parameter fulfils the safety criterion.

In Example 13, the subject matter of any one of Examples 1 to 12 can optionally include that the safety parameter is fulfilled if the test location is free of vehicles and/or persons.

In Example 14, the subject matter of any one of Examples 1 to 13 can optionally include that the safety parameter is fulfilled if the test location is determined to include a road length that is greater than a predefined road length, wherein the road length is determined to be free of vehicles and/or persons.

In Example 15, the subject matter of any one of Examples 1 to 14 can optionally include: monitoring the testing of the autonomous driving system.

In Example 16, the subject matter of Example 15 can optionally include that the monitoring is carried out by one or more sensors.

In Example 17, the subject matter of any one of Examples 1 to 16 can optionally include that the determining the occupation state of the autonomous ground vehicle is carried out by one or more sensors.

In Example 18, the subject matter of any one of Examples 1 to 17 can optionally include that the determining the safety parameter of the test location is carried out by one or more sensors.

In Example 19, the subject matter of any one of Examples 16 to 18 or Example 43 can optionally include that the one or more sensors include at least one sensor of the autonomous ground vehicle.

In Example 20, the subject matter of any one of Examples 16 to 19 or Example 43 can optionally include that the one or more sensors include at least one sensor external to the autonomous ground vehicle.

In Example 21, the subject matter of Example 20 can optionally include that the at least one sensor includes at least one roadside sensor.

In Example 22, the subject matter of Example 20 or 21 can optionally include that the at least one sensor includes at least one sensor of another vehicle.

In Example 23, the subject matter of any one of Examples 20 to 22 can optionally include: via the autonomous ground vehicle, sending a data requesting message, the message including a request to the at least one sensor external to the autonomous ground vehicle to provide sensing data.

In Example 24, the subject matter of any one of Examples 1 to 23 can optionally include that the determining of the safety parameter of the test location is continuously repeated.

In Example 25, the subject matter of any one of Examples 1 to 24 can optionally include that the determining of the safety parameter is repeated at least until the testing is completed.

In Example 26, the subject matter of any one of Examples 1 to 25 can optionally include: if the safety parameter of the test location does not fulfil the safety criterion, aborting the testing of the autonomous driving system or restart the testing routine.

In Example 27, the subject matter of Example 26 can optionally include: reporting the data to a computing system (e.g., via the computing system, processing the data or storing the data), wherein the data represents the monitoring of the testing of the autonomous driving system.

In Example 28, the subject matter of Example 27 can optionally include that the computing system includes a system of the autonomous ground vehicle.

In Example 29, the subject matter of Example 27 or 28 can optionally include that computing system includes a system external to the autonomous ground vehicle.

In Example 30, the subject matter of Example 29 can optionally include that the system external to the autonomous ground vehicle is a system of a service provider or of manufacture of the autonomous ground vehicle.

In Example 31, the subject matter of any one of Examples 27 to 30 can optionally include:

by the computing system, processing the data to provide instruction information based on the data, providing the instruction information to the autonomous driving system.

In Example 32 is the method according the example 31 can optionally include that the instruction information include instructions to set up at least one the following:

a service schedule;

navigational destination information; and/or restart the testing of the autonomous driving system.

In Example 33 is the method according the example 31 or 32 can optionally include that the instruction information include instructions for adapting one or more autonomous driving parameters of the autonomous driving system and/or for adapting one or more algorithms of the autonomous driving system.

In Example 34 is the method according the example 33 can optionally include that the adapting is carried out by a machine learning algorithm.

In Example 35 is the method according the example 33 or 34 can optionally include:

via the computing system, comparing the data with stored data;

via the computing system, determine a deviation parameter representing a deviation of the data from the stored data;

wherein the adapting one or more autonomous driving parameters is based on the deviation parameter, e.g., compensates the deterioration of the autonomous ground vehicle.

In Example 36 is the method according the example 35 can optionally include that the previously stored data represents a manufacturer reference or a previously carried out testing of the autonomous driving system.

In Example 37, the subject matter of any one of Examples 1 to 36 can optionally include that the testing the autonomous driving system is initiated by one or more than one of the following:

an external request received by the autonomous driving system;

a command of an authenticated user of the autonomous ground vehicle;

a software update of the autonomous driving system;

an environmental related event;

a sensor reliability related event;

an autonomous driving performance related event; or a schedule event.

In Example 38, the subject matter of Example 37 can optionally include that the external request originates from at least one of the following:

a vehicle service provider;

another ground vehicle; or an insurance provider.

In Example 39, the subject matter of any one of Examples 37 or 38 can optionally include:

determining a suitability parameter of at least one environmental location, if the suitability parameter fulfils a testing suitability criterion, setting the at least one environmental location as the determined test location and triggering the environmental related event.

In Example 40, the subject matter of Example 39 can optionally include that the at least one environmental location is the current location of the autonomous ground vehicle or is based on geolocational information received by the autonomous ground vehicle, wherein the geolocational information represent the at least one environmental location.

In Example 41, the subject matter of any one of Examples 37 to 40 can optionally include:

determining a sensor reliability parameter of at least one sensor of the autonomous ground vehicle;

if the sensor reliability parameter fulfils a reliability criterion, triggering the sensor reliability related event.

In Example 42, the subject matter of any one of Examples 37 to 41 can optionally include:

determining an autonomous driving performance parameter of the autonomous ground vehicle;

if the autonomous driving performance parameter a performance criterion, triggering the autonomous driving performance related event.

In Example 43, the subject matter of any one of Examples 37 to 42 can optionally include that the determining of the autonomous driving performance parameter is carried out by one or more sensors.

In Example 44, the subject matter of any one of Examples 1 to 43 can optionally include: if the safety parameter of the test location does not fulfil the safety criterion, sending one or more messages by the autonomous ground vehicle to one or more other autonomous ground vehicles, wherein the one or more messages includes a request for enhancing the safety parameter.

In Example 45, the subject matter of any one of Examples 1 to 44 can optionally include that the determining the occupation state is carried out during the autonomous ground vehicle is driving.

In Example 46, the subject matter of any one of Examples 1 to 45 can optionally include that the determining the occupation state is carried out during the autonomous ground vehicle is stationary to the ground.

Example 47 is an autonomous ground vehicle, including:

an autonomous driving system, and one or more processors configured to perform the method according to one of the examples 1 to 46.

Example 48 is a non-transitory computer-readable medium comprising instructions, which, when carried out by one or more processors, implement (e.g., direct the one or more processors to carry out) the method according to one of the examples 1 to 46.

Example 49 is a means for autonomous driving of an autonomous ground vehicle and/or for providing one or more autonomous driving functions including, a means for determining an occupation state of the autonomous ground vehicle; and a means for, if the occupation state is unoccupied, autonomously initiating a testing routine, the testing routine comprising:

determining a test location, determining a safety parameter of the test location;

if the safety parameter fulfils a safety criterion, testing the autonomous ground vehicle and/or the one or more autonomous driving functions in the test location.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for operating an autonomous ground vehicle, the method comprising:

via one or more processors, determining an occupation state of the autonomous ground vehicle;

if the occupation state is unoccupied, autonomously initiating a testing routine, the testing routine comprising:

determining a test location, determining a safety parameter of the test location;

if the safety parameter fulfils a safety criterion, testing an autonomous driving system of the autonomous ground vehicle in the test location;

wherein the safety parameter fulfills the safety criterion, if the test location is free of persons.

2. The method of claim 1, wherein testing the autonomous driving system comprises:

defining a virtual obstacle;

testing a response of the autonomous driving system to the virtual obstacle.

3. The method according to claim 1, wherein testing the autonomous driving system comprises:

defining a physical obstacle;

testing a response of the autonomous driving system to the physical obstacle.

4. The method according to claim 3, wherein the physical obstacle is provided by another autonomous ground vehicle.

5. The method according to claim 4, further comprising: requesting by the autonomous vehicle for the another autonomous ground vehicle to provide the obstacle.

6. The method according to claim 1, wherein the testing location is a public location.

7. The method according to claim 1, further comprising: monitoring the testing of the autonomous driving system by one or more sensors.

8. The method according to claim 7, wherein the one or more sensors include at least one sensor external to the autonomous ground vehicle.

9. The method according to claim 8, wherein the at least one sensor includes at least one roadside sensor or at least one sensor of another vehicle.

10. The method according to claim 7, further comprising: reporting data to a computing system, wherein the data represents the monitoring of the testing of the autonomous driving system.

11. The method according to claim 10, further comprising:

by the computing system, processing the data to provide instruction information based on the data, providing the instruction information to the autonomous driving system.

12. The method according the claim 11, wherein the instruction information comprise instructions for adapting one or more autonomous driving parameters of the autonomous driving system.

13. The method according to claim 1, further comprising:

if the safety parameter of the test location does not fulfil the safety criterion, aborting the testing of the autonomous driving system or restart the testing routine.

14. The method according to claim 1, further comprising:

if the safety parameter of the test location does not fulfil the safety criterion, sending one or more messages by the autonomous ground vehicle to one or more other autonomous ground vehicles, wherein the one or more messages includes a request for enhancing the safety parameter.

15. The method according to claim 1, wherein the testing the autonomous driving system is initiated by one or more than one of the following:

an external request received by the autonomous driving system;

a software update of the autonomous driving system;

Hall an environmental related event.

16. An autonomous ground vehicle, comprising:

an autonomous driving system, and one or more processors configured to perform a method, the method comprising:

determining an occupation state of the autonomous ground vehicle;

if the occupation state is unoccupied, autonomously initiating a testing routine, the testing routine comprising:

determining a test location, determining a safety parameter of the test location;

if the safety parameter fulfils a safety criterion, testing the autonomous driving system of the autonomous ground vehicle in the test location.

17. The autonomous ground vehicle according to claim 16, wherein the safety parameter fulfills the safety criterion, if the test location is free of persons.

18. The autonomous ground vehicle according to claim 16, further comprising:

one or more sensors, wherein the one or more processors are configured to determine the safety parameter of the test location by the one or more sensors.

19. A non-transitory computer-readable medium comprising instructions, which, when carried out by one or more processors, implement a method, the method comprising:

determining an occupation state of the autonomous ground vehicle;

if the occupation state is unoccupied, autonomously initiating a testing routine, the testing routine comprising:

determining a test location, determining a safety parameter of the test location;

if the safety parameter fulfils a safety criterion, testing an autonomous driving system of the autonomous ground vehicle in the test location;

wherein the testing the autonomous driving system is initiated by one or more than one of the following: a software update of the autonomous driving system;

or an environmental related event.

20. The non-transitory computer-readable medium according to claim 19, wherein the safety parameter fulfills the safety criterion, if the test location is free of persons.

* * * * *